United States Patent
Lv et al.

(10) Patent No.: US 11,835,686 B2
(45) Date of Patent: Dec. 5, 2023

(54) OPTICAL IMAGING LENS

(71) Applicant: ZHEJIANG SUNNY OPTICAL, CO., LTD, Zhejiang (CN)

(72) Inventors: Saifeng Lv, Zhejiang (CN); Fujian Dai, Zhejiang (CN); Liefeng Zhao, Zhejiang (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 551 days.

(21) Appl. No.: 17/033,889

(22) Filed: Sep. 27, 2020

(65) Prior Publication Data
US 2021/0109325 A1  Apr. 15, 2021

(30) Foreign Application Priority Data
Oct. 9, 2019  (CN) .......................... 201910953640.7

(51) Int. Cl.
*G02B 9/64* (2006.01)
*G02B 13/00* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC ... G02B 9/64; G02B 13/0045; G02B 27/0025
See application file for complete search history.

(56) References Cited

U.S. PATENT DOCUMENTS

| 8,947,790 | B2 | 2/2015 | Tsai et al. |
| 10,215,966 | B2 | 2/2019 | Liao et al. |
| 2019/0235212 | A1 | 8/2019 | Chen |

*Primary Examiner* — Jack Dinh
(74) *Attorney, Agent, or Firm* — Gang Yu

(57) ABSTRACT

The disclosure discloses an optical imaging lens, wherein the optical imaging lens sequentially from an object side to an image side along an optical axis includes, a first lens having a focal power; a second lens having a focal power, with an object side surface being a convex surface, and an image side surface being a concave surface; a third lens having a focal power; a fourth lens having a focal power; a fifth lens having a focal power, with an object side surface being a concave surface; a sixth lens having a focal power; a seventh lens having a positive focal power; and an eighth lens having a negative focal power; wherein, a total effective focal length f of the optical imaging lens and a combined focal length f34 of the third lens and the fourth lens satisfy: $0 < f/f34 \leq 0.6$.

17 Claims, 15 Drawing Sheets

OPTICAL IMAGING LENS

CROSS-REFERENCE TO RELATED APPLICATION(S)

The disclosure claims priority to Chinese Patent Application No. 201910953640.7, filed on Oct. 9, 2019 and entitled "Optical Imaging Lens", the contents of which are hereby incorporated by reference in its entirety.

TECHNICAL FIELD

The disclosure relates to an optical imaging lens, and more particularly to an optical imaging lens including eight lenses.

BACKGROUND

In recent years, with the rapid development of portable electronic products such as smart phones and tablet computers, people have increasingly higher requirements for imaging lenses mounted on portable electronic devices. On the one hand, people are pursuing the miniaturization and lightness of portable electronic products. On the other hand, the imaging lenses mounted on the portable electronic device is required to have high imaging quality. This requires a supporting optical imaging lens to meet the requirements of miniaturization and high imaging quality.

SUMMARY

Some embodiments of the disclosure provides an optical imaging lens applicable to portable electronic products that addresses, at least in part, or at least one of the above-mentioned disadvantages of the prior art.

One embodiment of the disclosure provides an optical imaging lens, wherein the optical imaging lens sequentially includes from an object side to an image side along an optical axis: a first lens having a focal power; a second lens having a focal power, with an object side surface being a convex surface, and an image side surface being a concave surface; a third lens having a focal power; a fourth lens having a focal power; a fifth lens having a focal power, with an object side surface being a concave surface and an image side surface being a convex surface; a sixth lens having a focal power; a seventh lens having a positive focal power; and an eighth lens having a negative focal power.

In one embodiment, a total effective focal length f of the optical imaging lens and a combined focal length f34 of the third lens and the fourth lens satisfy $0<f/f34≤0.6$.

In one embodiment, the total effective focal length f of the optical imaging lens and a curvature radius R13 of an object side surface of the seventh lens satisfy $f/R13>2.5$.

In one embodiment, a spacing distance T23 of the second lens and the third lens on the optical axis and a center thickness CT2 of the second lens on the optical axis satisfy: $2.0<T23/CT2<3.5$.

In one embodiment, a spacing distance T45 of the fourth lens and the fifth lens on the optical axis and a center thickness CT5 of the fifth lens on the optical axis satisfy: $1.5<T45/CT5<2.5$.

In one embodiment, the total effective focal length f of the optical imaging lens and an effective focal length f7 of the seventh lens satisfy: $1.5<f/f7<2.0$.

In one embodiment, an effective focal length f5 of the fifth lens and an effective focal length f6 of the sixth lens satisfy: $0.8≤f5/f6<2.0$.

In one embodiment, the total effective focal length f of the optical imaging lens, a curvature radius R3 of an object side surface of the second lens and a curvature radius R4 of the image side surface of the second lens satisfy: $f/R3+f/R4>4.5$.

In one embodiment, the total effective focal length f of the optical imaging lens, a curvature radius R9 of an object side surface of the fifth lens, and a curvature radius R10 of an image side surface of the fifth lens satisfy: $f/R9+f/R10<-7.0$.

In one embodiment, the total effective focal length f of the optical imaging lens and an effective focal length f1 of the first lens satisfy: $0.9≤f/f1≤1.1$.

In one embodiment, the total effective focal length f of the optical imaging lens and a combined focal length f67 of the sixth lens and the seventh lens satisfy: $1.0≤f/f67<1.5$.

In one embodiment, the total effective focal length f of the optical imaging lens and the Entrance Pupil Diameter (EPD) of the optical imaging lens satisfy: $f/EPD<1.45$.

In one embodiment, an effective focal length f2 of the second lens and an effective focal length f8 of the eighth lens satisfy: $2<f2/f8<3$.

In one embodiment, a curvature radius R1 of an object side surface of the first lens and a curvature radius R2 of an image side surface of the first lens satisfy: $-0.5<R1/R2<0$.

In one embodiment, a center thickness CT3 of the third lens on the optical axis, a center thickness CT4 of the fourth lens on the optical axis, a center thickness CT6 of the sixth lens on the optical axis, and a center thickness CT7 of the seventh lens on the optical axis satisfy: $1≤(CT3+CT4)/(CT6+CT7)<1.2$.

In one embodiment, a spacing distance T78 of the seventh lens and the eighth lens on the optical axis and a center thickness CT8 of the eighth lens on the optical axis satisfy: $1.2<T78/CT8<1.8$.

In one embodiment, a distance TTL from an object side surface of the first lens to an imaging surface of the optical imaging lens on the optical axis and EPD of the optical imaging lens satisfy: $TTL/EPD≤2.0$.

In one embodiment, the total effective focal length f of the optical imaging lens and a maximum Field of View (FOV) of the optical imaging lens satisfy: $f×TAN(FOV/2)>4.0$ mm.

In one embodiment, Abbe number V7 of the seventh lens and Abbe number V6 of the sixth lens satisfy: $0≤V7-V6<15$.

An optical imaging lens provided herein includes a plurality of lenses, such as the first lens to the eighth lens. By reasonably setting the ratio of the total effective focal length of the optical imaging lens to the combined focal length of the third lens and the fourth lens, and optimizing the focal power and surface shape of each lens, the optical imaging lens improves the imaging quality while being miniaturized, lighter and thinner.

BRIEF DESCRIPTION OF THE DRAWINGS

Other features, objects, and advantages of the disclosure will become apparent from the following detailed description of non-limiting embodiments, taken in conjunction with the accompanying drawings. In the drawings.

DETAILED DESCRIPTION OF THE EMBODIMENTS

Figure 1:
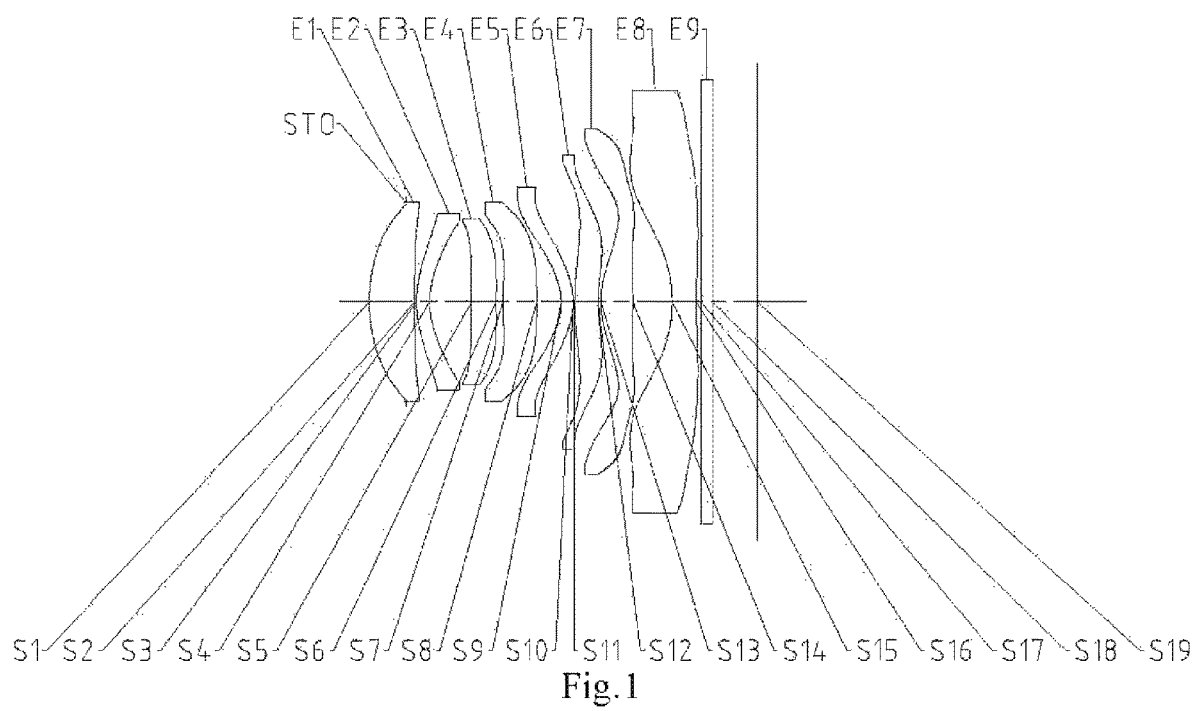
FIG. 1 shows a schematic structural diagram of an optical imaging lens according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by the general technical personnel in the field of the disclosure. It also should be understood that the terms (for example, terms defined in a common dictionary) should be explained to have meanings consistent with the meanings in the context of correlation technique and cannot be explained with ideal or excessively formal meanings, unless clearly defined like this in the disclosure.

It should be noted that the embodiments in the disclosure and features in the embodiments can be combined without conflicts. The disclosure will be described below with reference to the drawings and in combination with the embodiments in detail.

The features, principles and other aspects of the disclosure will be described below in detail.

An optical imaging lens according to an exemplary embodiment of the disclosure may include eight lenses having focal powers, that is, a first lens, a second lens, a third lens, a fourth lens, a fifth lens, a sixth lens, a seventh lens, and an eighth lens.

The eight lenses are sequentially arranged from an object side to an image side along an optical axis. The adjacent lenses may have air space between them.

In an exemplary embodiment, the first lens may have a positive focal power; the second lens can have a negative focal power, with an object side surface being a convex surface, and an image side surface being a concave surface; the third lens has a negative focal power; the fourth lens has a positive focal power; the fifth lens has a negative focal power, with an object side surface being a concave surface, and an image side surface being a convex surface; the sixth lens has a negative focal power; the seventh lens may have a positive focal power; and the eighth lens may have a negative focal power. The reasonable combination of the refractive power and the surface type of each lens in the optical system may effectively balance aberration of the optical system and improve the imaging quality.

In an exemplary embodiment, both an object side surface and an image side surface of the first lens may be a convex surface.

In an exemplary embodiment, an image side surface of the third lens may be a concave surface.

In an exemplary embodiment, both an object side surface and an image side surface of the fourth lens may be a convex surface.

In an exemplary embodiment, an object side surface of the sixth lens may be a convex surface, and an image side surface of the sixth lens may be concave.

In an exemplary embodiment, an object side surface of the seventh lens may be a convex surface.

In an exemplary embodiment, both an object side surface and an image side surface of the eighth lens may be a concave surface.

In an exemplary embodiment, the total effective focal length f of the optical imaging lens and a combined focal length f34 of the third lens and the fourth lens may satisfy: 0</f34<=0.6, e.g., 0.4<f/f34<=0.6. Reasonably allocating the combined focal lengths of the third lens and the fourth lens is beneficial to slowing down the deflection of light, reducing the sensitivity, shortening the overall length of the optical imaging lens and realizing the miniaturization of the lens.

In an exemplary embodiment, the total effective focal length f of the optical imaging lens and a curvature radius R13 of an object side surface of the seventh lens can satisfy: f/R13>2.5, e.g., 2.5<f/R13<3.5. Reasonably setting the proportional relation of the total effective focal length of the optical imaging lens to the curvature radius of the object side surface of the seventh lens is beneficial to increasing the aperture of the optical system, reducing the light deflection angle and system sensitivity in a large aperture state, and improving the imaging quality of the optical imaging lens in a close-range state.

In an exemplary embodiment, a spacing distance T23 of the second lens and the third lens on the optical axis and a center thickness CT2 of the second lens on the optical axis may satisfy: 2.0<T23/CT2<3.5. Reasonably setting the proportional relation of the spacing distance between the second lens and the third lens on the optical axis to the center thickness of the second lens on the optical axis is beneficial to ensuring the feasibility of processing the second lens.

In an exemplary embodiment, a spacing distance T45 of the fourth lens and the fifth lens on the optical axis and a center thickness CT5 of the fifth lens on the optical axis may satisfy: 1.5<T45/CT5<2.5. Setting the ratio of the spacing distance between the fourth lens and the fifth lens on the optical axis to the center thickness of the fifth lens on the optical axis within a reasonable value range is beneficial not only to realizing the miniaturization of the lens, but also to avoiding the reflection of light between the two lens surfaces.

In an exemplary embodiment, the total effective focal length f of the optical imaging lens and the effective focal length F of the seventh lens may satisfy: 1.5<f/f7<2.0. Reasonably setting the proportional relation of the total effective focal length of the optical imaging lens to the effective focal length of the seventh lens is beneficial to improving the imaging quality of the large-aperture optical system in the close-range state to obtain a good photographing effect.

In an exemplary embodiment, an effective focal length f5 of the fifth lens and an effective focal length f6 of the sixth lens may satisfy: 0.8≤f5/f6<2.0. Reasonably allocating the focal powers of the fifth lens and the sixth lens is beneficial to eliminating the chromatic aberration of the system, reducing the secondary spectrum of the optical system, and improving the imaging quality of the system.

In an exemplary embodiment, the total effective focal length f of the optical imaging lens, a curvature radius R3 of an object side surface of the second lens, and a curvature radius R4 of an image side surface of the second lens can satisfy: f/R3+f/R4>4.5, e.g., 5.5<f/R3+f/R4<6.0. Reasonably setting the relationship between the total effective focal length of the optical imaging lens, the curvature radius of the object side surface of the second lens, and the curvature radius of the image side surface of the second lens is beneficial to alleviating the deflection of the downward light, reducing the overall sensitivity of the system, and improving the imaging quality of the optical system. Especially in the large-aperture system, when an incident angle and an exit angle of a lower part of a diaphragm are too large, the effect is more obvious.

In an exemplary embodiment, the total effective focal length f of the optical imaging lens, a curvature radius R9 of an object side surface of the fifth lens, and a curvature radius R10 of an image side surface of the fifth lens may satisfy: f/R9+f/R10<−7.0, e.g., −9.0<f/R9+f/R10<−7.0. Reasonably setting the relationship between the total effective focal length of the optical imaging lens, the curvature radius of the object side surface of the fifth lens, and the curvature radius of the image side surface of the fifth lens, and effectively allocating the radii of curvature of the object side surface and the image side surface of the fifth lens are beneficial to converging the aberrations of the optical system and improving the imaging quality.

In an exemplary embodiment, the total effective focal length f of the optical imaging lens and an effective focal length f1 of the first lens may satisfy: 0.9≤f/f1≤1.1. Reasonably setting the proportional relation of the total effective focal length of the optical imaging lens to the effective focal length of the first lens, and effectively allocating the focal power of the first lens, are beneficial to reducing the sensitivity of the field of view in a central area of the optical system.

In an exemplary embodiment, the total effective focal length f of the optical imaging lens and a combined focal length f67 of the sixth lens and the seventh lens may satisfy: 1.0≤f/f67<1.5. Reasonably setting the proportional relation of the total effective focal length of the optical imaging lens to the combined focal length of the sixth lens and the seventh lens is beneficial to increasing the edge field image height of the optical system, and realizing the high pixels and large image plane characteristics of the optical system.

In an exemplary embodiment, the total effective focal length f of the optical imaging lens and an Entrance Pupil Diameter (EPD) of the optical imaging lens may satisfy: f/EPD<1.45, e.g., 1.35<f/EPD<1.45. Reasonably setting the proportional relation of the total effective focal length of the optical imaging lens to EPD of the optical imaging lens is beneficial to increasing the light flux of the optical system and improving the photographing effect of the optical system in a dark environment.

In an exemplary embodiment, an effective focal length f2 of the second lens and an effective focal length f8 of the eighth lens may satisfy: 2<f2/f8<3. Reasonably setting the proportional relation of the effective focal length of the second lens to the effective focal length of the eighth lens is beneficial to reducing the sensitivity of the field of view in the central area of the optical system and avoiding the degradation of imaging quality in local areas of the central area.

In an exemplary embodiment, a curvature radius R1 of an object side surface of the first lens and a curvature radius R2 of an image side surface of the first lens may satisfy: −0.5<R1/R2<0, e.g., −0.2<R1/R2<0. Reasonably setting the proportional relation of the curvature radius of the object side surface of the first lens to the curvature radius of the image side surface of the first lens is beneficial not only to weakening the ghost image formed by light reflection inside the optical system, but also to improving the spherical aberration of the system, and reducing the sensitivity of the field of view in the center area.

In an exemplary embodiment, a center thickness CT3 of a third lens on the optical axis, a center thickness CT4 of a fourth lens on the optical axis, a center thickness CT6 of a sixth lens on the optical axis, and a center thickness CT7 of a seventh lens on the optical axis may satisfy: 1≤(CT3+CT4)/(CT6+CT7)<1.2.

Reasonably allocating the center thicknesses of the four lenses mentioned above is beneficial not only to ensuring the molding characteristics of the lenses, reducing the degree of light deflection in the system and reducing the system sensitivity, but also to shortening the overall length of the optical system and realizing the miniaturization of the lens.

In an exemplary embodiment, a spacing distance T78 of the seventh lens and the eighth lens on the optical axis and a center thickness CT8 of the eighth lens on the optical axis satisfy: 1.2<T78/CT8<1.8. Reasonably setting the proportional relation of the spacing distance between the seventh lens and the eighth lens on the optical axis to the center thickness of the eighth lens on the optical axis is beneficial to improving the imaging quality of the optical system in the close-range state. Therefore, the optical system can take into account both near-range imaging and far-range imaging, and obtain better imaging quality.

In an exemplary embodiment, a distance TTL from an object side surface of the first lens to an imaging surface of the optical imaging lens on the optical axis and an EPD of the optical imaging lens may satisfy: TTL/EPD≤2.0, e.g., 1.8<TTL/EPD≤2.0. Reasonably setting the proportional relation of the distance from the object side surface of the first lens to the imaging surface of the optical imaging lens on the optical axis and the EPD of the optical imaging lens is beneficial not only to increasing the light flux of the optical system, improving the photographing effect of the optical system in a dark environment, but also realizing the miniaturization of the lens.

In an exemplary embodiment, the total effective focal length f of the optical imaging lens and a maximum Field of View (FOV) of the optical imaging lens may satisfy: f×TAN (FOV/2)>4.0 mm, for example, 4.0 mm<f×TAN(FOV/2) <4.5 mm. Reasonably setting the proportional relation between the total effective focal length of the optical imaging lens and the maximum FOV of the optical imaging lens is beneficial to realizing the high pixels and large image plane characteristics of the optical imaging lens, so as to improve the photographing effect and the imaging quality.

In an exemplary embodiment, Abbe number V7 of the seventh lens and Abbe number V6 of the sixth lens may satisfy: 0≤V7−V6<15. Reasonably setting the proportional relation between the Abbe number of the seventh lens and the Abbe number of the sixth lens is beneficial to converging the overall aberration of the optical system and improving the imaging quality.

In an exemplary embodiment, the optical imaging lens may further include a diaphragm. The diaphragm may be disposed in place as desired. For example, the diaphragm may be disposed between the object side and the first lens. Alternatively, the optical imaging lens may further include a filter for correcting a color deviation and/or a protective glass for protecting a photosensitive element located on the imaging surface.

The optical imaging lens according to the above-described embodiment of the disclosure may employ a plurality of lenses, e.g. eight lenses as above. The optical imaging lens provided by the disclosure can meet the requirements of large aperture, large image plane, high pixel, portability and the like; has excellent imaging quality in both a long-range view and a short-range view, and can obtain satisfactory imaging effects in different environments.

In an exemplary embodiment, at least one of the mirror surfaces of each lens is an aspherical mirror surface, that is, at least one of the object side surface of the first lens to the image side surface of the eighth lens is an aspherical mirror surface. The aspherical lens is characterized in that: the curvature varies continuously from the center of the lens to the periphery of the lens. Unlike a spherical lens having a constant curvature from the center of the lens to the periphery of the lens, an aspherical lens has better curvature radius characteristics, and has the advantages of improving distortion aberrations and improving astigmatic aberration. By adopting the aspherical lens, the aberration occurring during imaging can be eliminated as much as possible, thereby improving the imaging quality. Optionally, at least one of the object side surface and the image side surface of each of the first lens, the second lens, the third lens, the fourth lens, the fifth lens, the sixth lens, the seventh lens, and the eighth lens is an aspherical mirror surface. Alternatively, both the object side surface and the image side surface of each of the first lens, the second lens, the third lens, the fourth lens, the fifth lens, the sixth lens, the seventh lens, and the eighth lens are the aspherical mirror surfaces.

The disclosure also provides an imaging device, wherein the electronic photosensitive element can be a Charge Coupled Device (CCD) or a Complementary Metal Oxide Semiconductor (CMOS). The imaging device may be an independent imaging device like a digital camera or an imaging module integrated into a mobile electronic device like a mobile phone. The imaging device is equipped with the optical imaging lens described above.

However, those skilled in the art should know that the number of the lenses forming the optical imaging lens may be changed without departing from the technical solutions claimed in the disclosure to achieve each result and advantage described in the description. For example, although descriptions are made in the implementation mode with eight lenses as an example, the optical imaging lens is not limited to eight lenses. If necessary, the optical imaging lens may further include another number of lenses.

Specific embodiments of the optical imaging lens applied to the abovementioned implementation mode will further be described below with reference to the drawings.

Embodiment 1

The optical imaging lens according to embodiment 1 of the disclosure is described below with reference to FIGS. 1 to 2D. FIG. 1 shows a schematic structural diagram of an optical imaging lens according to embodiment 1 of the disclosure.

As shown in FIG. 1, the optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7 an eighth lens E8, a filter E9, and an imaging surface S19.

The first lens E1 has a positive focal power, with an object side surface S1 being a convex surface and an image side surface S2 being a convex surface. The second lens E2 has a negative focal power, with an object side surface S3 being a convex surface and an image side surface S4 being a concave surface. The third lens E3 has a negative focal power, with an object side surface S5 being a concave surface and an image side surface S6 being a concave surface. The fourth lens E4 has a positive focal power, with an object side surface S7 being a convex surface and an image side surface S8 being a convex surface. The fifth lens E5 has a negative focal power, with an object side surface S9 being a concave surface and an image side surface S10 being a convex surface. The sixth lens E6 has a negative focal power, with an object side surface S11 being a convex surface and an image side surface S12 being a concave surface. The seventh lens E7 has a positive focal power, with an object side surface S13 being a convex surface and an image side surface S14 being a convex surface. The eighth lens E8 has a negative focal power, with an object side surface S15 being a concave surface and an image side surface S16 being a concave surface. The filter E9 has an object side surface S17 and an image side surface S18. Light from the object passes sequentially through the respective surfaces S1 to S18 and is finally imaged on an imaging surface 319.

Table 1 shows a basic parameter table of the optical imaging lens of embodiment 1, wherein, the units of curvature radius, thickness/distance, and focal length are millimeters (mm).

In embodiment 1, both the object side surface and the image side surface of any one of the first lens E1 to the eighth lens E8 are aspheric surfaces, and the surface shape x of each aspherical lens can be defined by, but not limited to, the following aspheric formula:

$$x = \frac{ch^2}{1 + \sqrt{1 - (k+1)c^2h^2}} + \sum A_i h^i \quad (1)$$

wherein, x is the distance vector height from a vertex of the aspheric surface when the aspheric surface is at a height of h along the optical axis direction; c is the paraxial curvature of the aspheric surface, c=1/R (that is, the paraxial curvature c is the reciprocal of the curvature radius R in Table 1 above); k is the coefficient of conicity; and Ai is the correction coefficient of the i-th-order of the aspheric sur-

TABLE 1

| Surface Number | Surface Types | Curvature radius | Thickness/ Distance | Materials Refractive index | Abbe number | Focal Length | Conic coefficient |
|---|---|---|---|---|---|---|---|
| OBJ | Sphere | Infinity | Infinity | | | | |
| STO | Sphere | Infinity | −0.6807 | | | | |
| S1 | Aspheric Surface | 3.1025 | 0.8482 | 1.546 | 56.11 | 5.60 | 0.0000 |
| S2 | Aspheric Surface | −179.6535 | 0.0334 | | | | 0.0000 |
| S3 | Aspheric Surface | 2.1250 | 0.2431 | 1.678 | 19.25 | −11.20 | −0.0449 |
| S4 | Aspheric Surface | 1.5833 | 0.7759 | | | | −0.0184 |
| S5 | Aspheric Surface | −66.6796 | 0.4634 | 1.546 | 56.11 | −42.32 | 0.0000 |
| S6 | Aspheric Surface | 35.4428 | 0.1261 | | | | 0.0000 |
| S7 | Aspheric Surface | 7.8578 | 0.6256 | 1.546 | 56.11 | 8.68 | −0.8346 |
| S8 | Aspheric Surface | −11.6100 | 0.4589 | | | | 0.0000 |
| S9 | Aspheric Surface | −1.0452 | 0.2165 | 1.678 | 19.25 | −10.43 | −1.0087 |
| S10 | Aspheric Surface | −1.3293 | 0.0300 | | | | −1.0221 |
| S11 | Aspheric Surface | 4.9963 | 0.4465 | 1.557 | 45.78 | −12.09 | −0.9945 |
| S12 | Aspheric Surface | 2.7814 | 0.0525 | | | | −0.0952 |
| S13 | Aspheric Surface | 1.7895 | 0.5966 | 1.546 | 56.11 | 2.76 | −0.9841 |
| S14 | Aspheric Surface | −8.4446 | 0.7300 | | | | 3.7052 |
| S15 | Aspheric Surface | −2.6032 | 0.4500 | 1.546 | 56.11 | −3.95 | −0.8698 |
| S16 | Aspheric Surface | 13.2773 | 0.0874 | | | | 0.0000 |
| S17 | Sphere | Infinity | 0.2100 | 1.517 | 64.17 | | |
| S18 | Sphere | Infinity | 0.8400 | | | | |
| S19 | Sphere | Infinity | | | | | |

In the embodiment, the total effective focal length f of the optical imaging lens is 5.19 mm, and the maximum FOV of the optical imaging lens is 80.5°.

face. The higher order term coefficients $A_4$, $A_6$, $A_8$, $A_{10}$, $A_{12}$, $A_{14}$, $A_{16}$, $A_{18}$ and $A_{20}$ that can be used for each of aspherical mirror surfaces S1-S16 in embodiment 1 are given in

TABLE 2

| Surface Number | A4 | A6 | A8 | A10 | A12 | A14 | A16 | A18 | A20 |
|---|---|---|---|---|---|---|---|---|---|
| S1 | 5.8613E−03 | 4.6792E−04 | −1.3152E−03 | 1.3540E−03 | −5.8068E−04 | 1.3488E−04 | −1.7196E−05 | 1.8982E−06 | −2.1444E−07 |
| S2 | 2.4637E−02 | −1.6377E−02 | 1.1404E−02 | −5.9757E−03 | 2.0447E−03 | −3.9541E−04 | 3.1895E−05 | 0.0000E+00 | 0.0000E+00 |
| S3 | −6.6907E−02 | 2.8834E−02 | −3.4960E−02 | 3.3529E−02 | −2.2308E−02 | 9.1498E−03 | −2.0746E−03 | 1.9910E−04 | 0.0000E+00 |
| S4 | −1.0554E−01 | 5.0777E−02 | −6.9110E−02 | 8.1554E−02 | −7.8099E−02 | 5.1570E−02 | −2.1923E−02 | 5.3576E−03 | −5.7825E−04 |
| S5 | −2.0634E−02 | 1.6589E−02 | −3.7120E−02 | 5.4880E−02 | −6.0094E−02 | 4.3872E−02 | −1.9971E−02 | 5.0603E−03 | −5.4408E−04 |
| S6 | −8.2437E−02 | 3.3333E−02 | −4.3312E−02 | 4.8003E−02 | −3.9095E−02 | 2.2305E−02 | −8.2710E−03 | 1.7417E−03 | −1.5484E−04 |
| S7 | −8.0561E−02 | 1.8051E−02 | −4.0310E−02 | 5.3323E−02 | −4.7508E−02 | 2.8951E−02 | −1.1174E−02 | 2.3904E−03 | −2.1109E−04 |
| S8 | −1.8880E−02 | −2.6689E−02 | 2.9206E−02 | −3.0489E−02 | 2.2224E−02 | −1.0425E−02 | 2.9925E−03 | −4.7802E−04 | 3.2586E−05 |
| S9 | 2.1739E−01 | −2.2943E−01 | 2.1925E−01 | −1.4616E−01 | 6.5013E−02 | −1.8637E−02 | 3.2973E−03 | −3.2761E−04 | 1.3985E−05 |
| S10 | 1.4748E−01 | −1.6340E−01 | 1.5746E−01 | −1.0196E−01 | 4.3580E−02 | −1.1981E−02 | 2.0289E−03 | −1.9201E−04 | 7.7501E−06 |
| S11 | −2.5554E−02 | −1.4135E−02 | 2.0518E−02 | −1.2255E−02 | 3.9455E−03 | −7.2828E−04 | 7.6293E−05 | −4.1430E−06 | 8.7896E−08 |
| S12 | −1.2354E−01 | −4.7902E−03 | 2.8083E−02 | −1.5246E−02 | 4.2064E−03 | −6.5426E−04 | 5.6748E−05 | −2.4778E−06 | 3.9139E−08 |
| S13 | −8.8540E−02 | 1.7091E−02 | 5.8937E−03 | −7.6989E−03 | 2.7284E−03 | −4.7708E−04 | 4.5330E−05 | −2.2488E−06 | 4.5774E−08 |
| S14 | 5.8545E−02 | −5.6112E−03 | −4.5185E−03 | 2.6817E−04 | 4.3787E−04 | −1.2324E−04 | 1.4533E−05 | −8.2839E−07 | 1.8789E−08 |

TABLE 2-continued

| Surface Number | A4 | A6 | A8 | A10 | A12 | A14 | A16 | A18 | A20 |
|---|---|---|---|---|---|---|---|---|---|
| S15 | −2.9905E−03 | −2.2576E−03 | 2.2154E−03 | −2.1464E−04 | −4.3979E−05 | 1.1567E−05 | −1.0757E−06 | 4.7289E−08 | −8.2468E−10 |
| S16 | −1.6434E−02 | 2.6858E−03 | −4.1328E−04 | 9.4615E−05 | −1.8914E−05 | 2.2005E−06 | −1.3945E−07 | 4.5149E−09 | −5.8780E−11 |

Figure 2A:
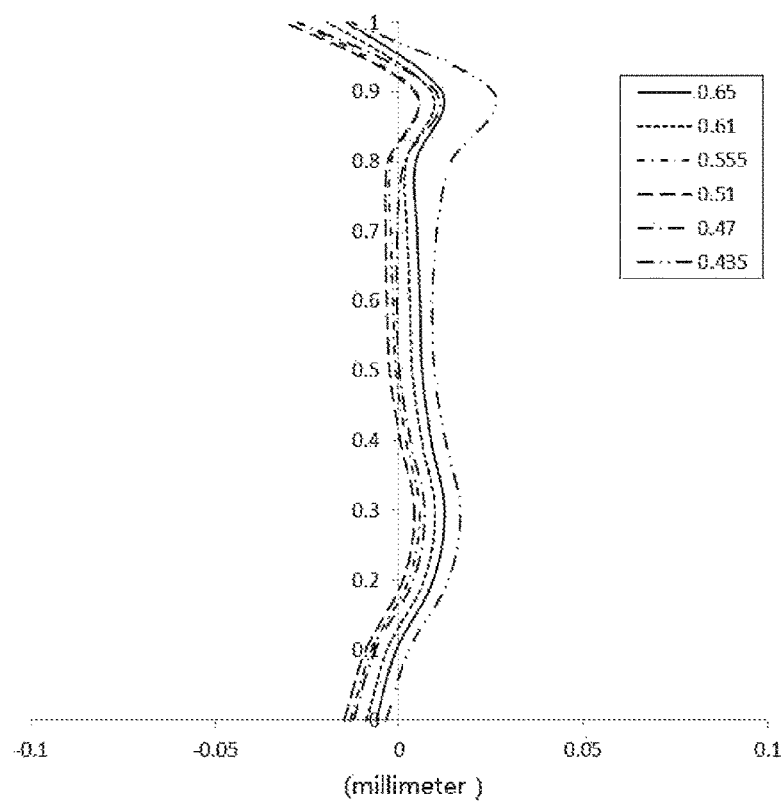
FIGS. 2A to 2D show an longitudinal aberration curve, an astigmatism curve, a distortion curve and a lateral color curve of the optical imaging lens of embodiment 1, respectively.
Figure 2B:
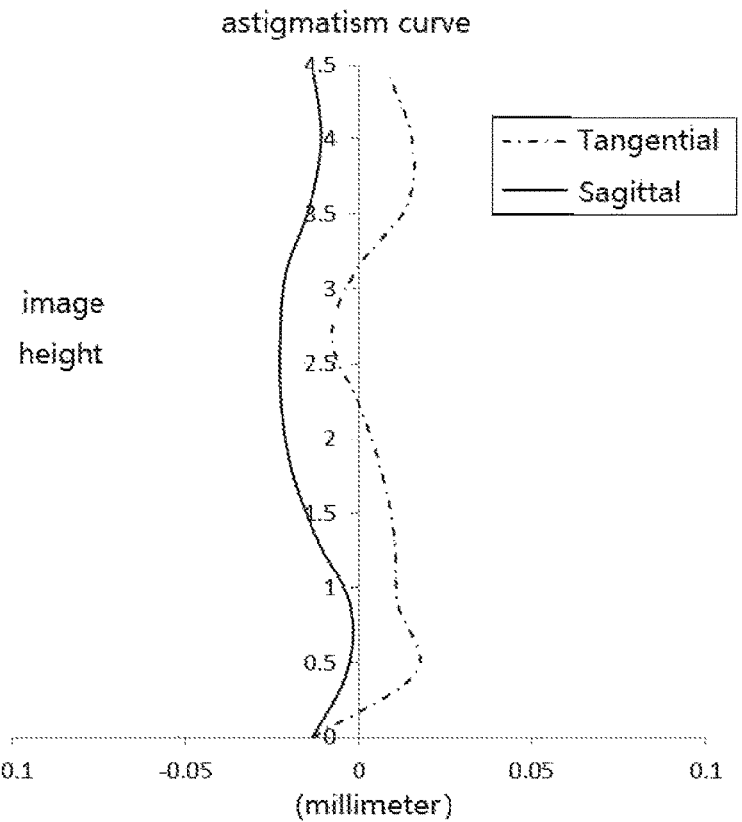
Figure 2C:
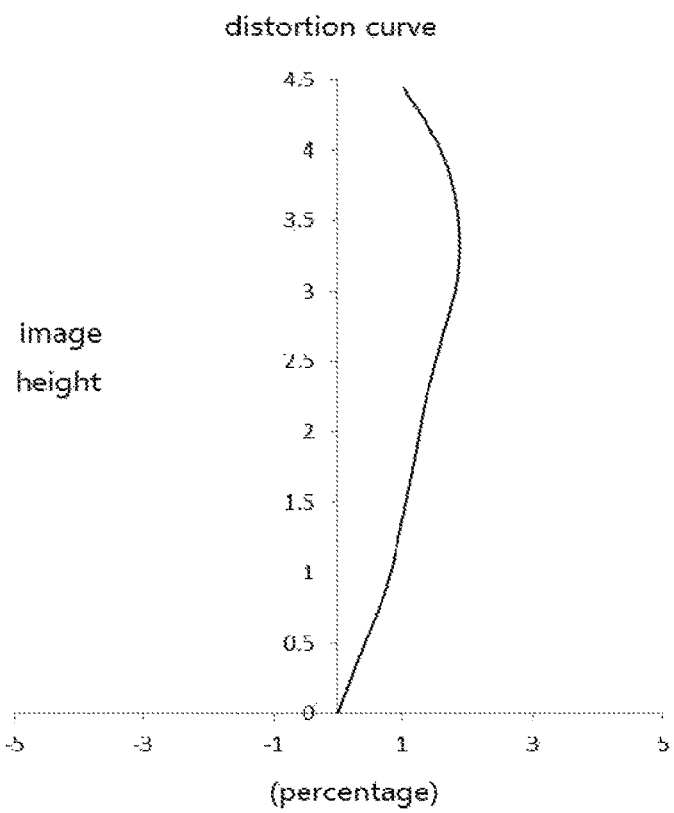
Figure 2D:
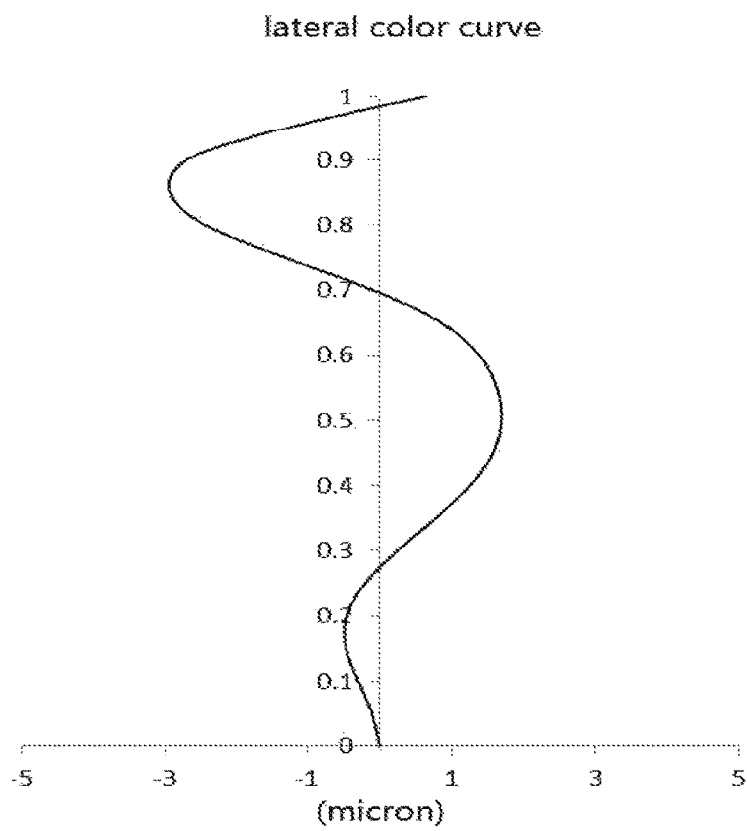

FIG. 2A shows an longitudinal aberration curve of the optical imaging lens of embodiment 1, which indicates the deviations of light of different wavelengths from a convergent focus point after passing through the lens. FIG. 2B shows anastigmatic curve of the optical imaging lens of embodiment 1, which indicates a meridian image plane curvature and a sagittal image plane curvature. FIG. 2C shows a distortion curve of the optical imaging lens of embodiment 1, which indicates distortion magnitude values corresponding to different image heights. FIG. 2D shows the lateral color curve of the optical imaging lens of embodiment 1, which indicates the deviation of different image heights on the imaging surface of light passing through the lens. It can be seen from FIGS. 2A to 2D that, the optical imaging lens provided in embodiment 1 can achieve good imaging quality.

Embodiment 2

Figure 3:
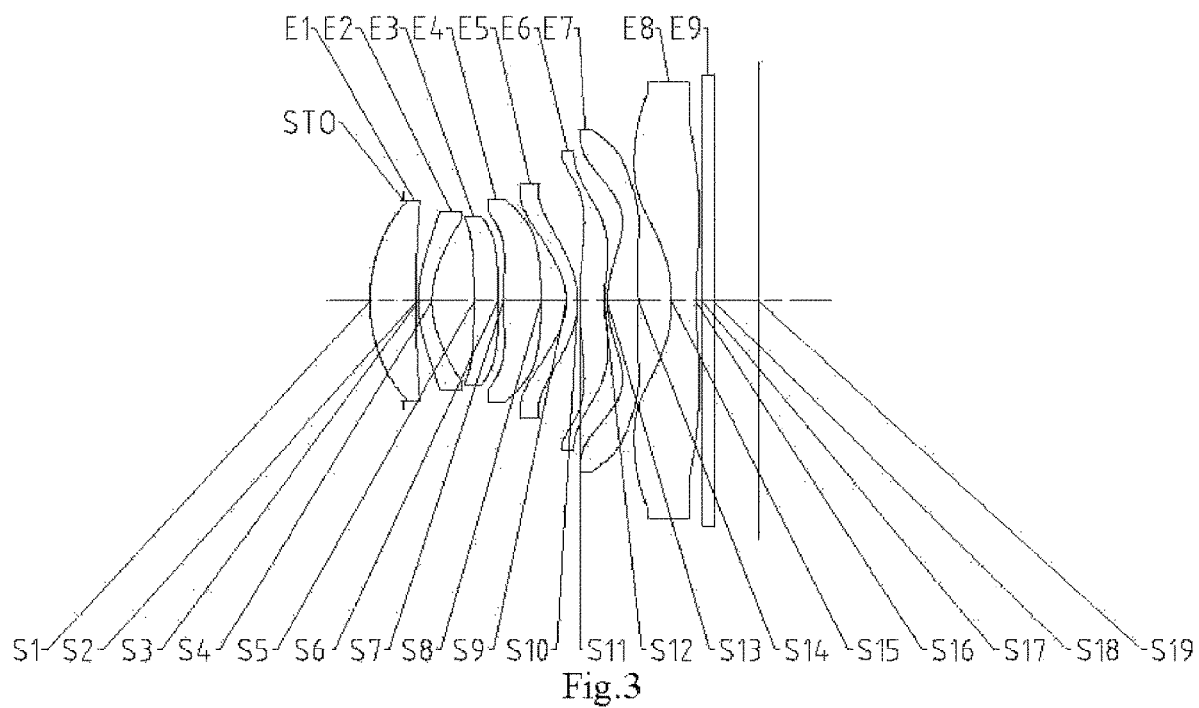
FIG. 3 shows a schematic structural diagram of an optical imaging lens according to embodiment 2 of the disclosure.

The optical imaging lens according to embodiment 2 of the disclosure is described below with reference to FIGS. 3 to 4D. FIG. 3 shows a schematic structural diagram of an optical imaging lens according to embodiment 2 of the disclosure.

As shown in FIG. 3, the optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9, and an imaging surface 319.

The first lens E1 has a positive focal power, with an object side surface S1 being a convex surface and an image side surface S2 being a convex surface. The second lens E2 has a negative focal power, with an object side surface S3 being a convex surface and an image side surface S4 being a concave surface. The third lens E3 has a negative focal power, with an object side surface S5 being a concave surface and an image side surface S6 being a concave surface. The fourth lens E4 has a positive focal power, with an object side surface S7 being a convex surface and an image side surface S8 being a convex surface. The fifth lens E5 has a negative focal power, with an object side surface S9 being a concave surface and an image side surface S10 being a convex surface. The sixth lens E6 has a negative focal power, with an object side surface S11 being a convex surface and an image side surface S12 being a concave surface. The seventh lens E7 has a positive focal power, with an object side surface S13 being a convex surface and an image side surface S14 being a convex surface. The eighth lens E8 has a negative focal power, with an object side surface S15 being a concave surface and an image side surface S16 being a concave surface. The filter E9 has an object side surface S17 and an image side surface S18. Light from the object passes sequentially through the respective surfaces S1 to S18 and is finally imaged on an imaging surface S19.

In the embodiment, the total effective focal length f of the optical imaging lens is 5.21 mm, and the maximum FOV of the optical imaging lens is 80.30.

Table 3 shows a basic parameter table of the optical imaging lens of embodiment 2, wherein, the units of curvature radius, thickness/distance, and focal length are millimeters (mm).

TABLE 3

| Surface Number | Surface Types | Curvature radius | Thickness/ Distance | Refractive index | Abbe number | Focal Length | Conic coefficient |
|---|---|---|---|---|---|---|---|
| OBJ | Sphere | Infinity | Infinity | | | | |
| STO | Sphere | Infinity | −0.6238 | | | | |
| S1 | Aspheric Surface | 3.0656 | 0.8698 | 1.546 | 56.11 | 5.12 | 0.0000 |
| S2 | Aspheric Surface | −28.4656 | 0.0301 | | | | 0.0000 |
| S3 | Aspheric Surface | 2.2393 | 0.2515 | 1.678 | 19.25 | −9.51 | 0.0593 |
| S4 | Aspheric Surface | 1.5863 | 0.7812 | | | | −0.0351 |
| S5 | Aspheric Surface | −30.2747 | 0.4389 | 1.546 | 56.11 | −23.03 | 0.0000 |
| S6 | Aspheric Surface | 21.6075 | 0.1086 | | | | 0.0000 |
| S7 | Aspheric Surface | 6.1706 | 0.6941 | 1.546 | 56.11 | 7.52 | 1.4501 |
| S8 | Aspheric Surface | −11.7817 | 0.4714 | | | | 0.0000 |
| S9 | Aspheric Surface | −1.0554 | 0.2160 | 1.678 | 19.25 | −11.47 | −0.9972 |
| S10 | Aspheric Surface | −1.3222 | 0.0300 | | | | −1.0176 |
| S11 | Aspheric Surface | 5.2654 | 0.4705 | 1.562 | 43.28 | −11.39 | −1.3507 |
| S12 | Aspheric Surface | 2.8001 | 0.0552 | | | | −0.1101 |
| S13 | Aspheric Surface | 1.7562 | 0.5834 | 1.546 | 56.11 | 2.75 | −1.0143 |
| S14 | Aspheric Surface | −9.1337 | 0.6136 | | | | 5.0000 |
| S15 | Aspheric Surface | −3.0657 | 0.4500 | 1.546 | 56.11 | −3.84 | −0.7377 |
| S16 | Aspheric Surface | 6.9580 | 0.1197 | | | | 0.0000 |
| S17 | Sphere | Infinity | 0.2100 | 1.517 | 64.17 | | |
| S18 | Sphere | Infinity | 0.8400 | | | | |
| S19 | Sphere | Infinity | | | | | |

In embodiment 2, both the object side surface and the image side surface of any one of the first lens E1 to the eighth lens E8 are aspheric surfaces. The higher order term coefficients $A_4$, $A_6$, $A_8$, $A_{10}$, $A_{12}$, $A_{14}$, $A_{16}$, $A_{18}$ and $A_{20}$ that can be used for each of aspherical mirror surfaces S1-S16 in embodiment 2 are given in Table 4 below.

TABLE 4

| Surface Number | A4 | A6 | A8 | A10 | A12 | A14 | A16 | A18 | A20 |
|---|---|---|---|---|---|---|---|---|---|
| S1 | 4.9278E−03 | 5.2486E−04 | −1.7472E−03 | 1.8825E−03 | −8.9180E−04 | 2.2385E−04 | −3.0370E−05 | 3.2276E−06 | −3.7451E−07 |
| S2 | 3.4438E−02 | −2.2753E−02 | 1.3937E−02 | −6.3392E−03 | 1.8929E−03 | −3.2380E−04 | 2.2663E−05 | 0.0000E+00 | 0.0000E+00 |
| S3 | −6.7857E−02 | 4.3287E−02 | −5.0430E−02 | 4.4144E−02 | −2.6813E−02 | 1.0233E−02 | −2.1946E−03 | 2.0129E−04 | 0.0000E+00 |
| S4 | −1.1837E−01 | 7.6089E−02 | −8.7068E−02 | 7.7847E−02 | −5.5062E−02 | 2.7867E−02 | −9.6609E−03 | 2.0661E−03 | −2.1134E−04 |
| S5 | −2.4388E−02 | 2.6363E−02 | −5.4081E−02 | 7.7842E−02 | −8.0925E−02 | 5.6147E−02 | −2.4504E−02 | 6.0342E−03 | −6.3511E−04 |
| S6 | −1.0398E−01 | 9.0490E−02 | −1.3325E−01 | 1.5706E−01 | −1.3190E−01 | 7.3841E−02 | −2.6045E−02 | 5.2256E−03 | −4.5248E−04 |
| S7 | −9.9758E−02 | 6.5993E−02 | −9.9443E−02 | 1.1133E−01 | −8.6912E−02 | 4.4709E−02 | −1.4434E−02 | 2.6474E−03 | −2.0824E−04 |
| S8 | −2.4630E−02 | −1.3615E−02 | 1.3556E−02 | −1.5090E−02 | 1.1661E−02 | −5.8922E−03 | 1.8366E−03 | −3.1740E−04 | 2.3182E−05 |
| S9 | 2.0726E−01 | −1.8094E−01 | 1.4302E−01 | −8.3625E−02 | 3.4053E−02 | −9.1501E−03 | 1.5426E−03 | −1.4799E−04 | 6.1574E−06 |
| S10 | 1.5632E−01 | −1.3888E−01 | 1.0934E−01 | −6.3314E−02 | 2.5690E−02 | −6.9436E−03 | 1.1795E−03 | −1.1295E−04 | 4.6170E−06 |
| S11 | −1.9841E−01 | −6.2588E−03 | 7.6698E−03 | −4.2781E−03 | 1.1255E−03 | −1.2489E−04 | −8.9136E−07 | 1.2934E−06 | −7.4310E−08 |
| S12 | −1.6058E−01 | 4.6220E−02 | −8.5781E−03 | 4.1305E−04 | 6.7485E−05 | 2.4127E−05 | −1.0125E−05 | 1.1457E−06 | −4.3550E−08 |
| S13 | −1.0458E−01 | 3.1234E−02 | −6.2996E−03 | −2.6175E−03 | 1.6276E−03 | −3.4856E−04 | 3.7746E−05 | −2.0828E−06 | 4.6679E−08 |
| S14 | 6.9424E−02 | −2.5171E−02 | 4.0577E−03 | −1.5266E−03 | 6.5359E−04 | −1.4183E−04 | 1.5987E−05 | −9.1684E−07 | 2.1305E−08 |
| S15 | −2.0062E−02 | −7.3659E−04 | 5.4851E−03 | −1.6718E−03 | 2.4506E−04 | −2.0751E−05 | 1.0405E−06 | −2.8831E−08 | 3.4124E−10 |
| S16 | −3.3934E−02 | 8.5660E−03 | −1.4367E−03 | 1.4002E−04 | −6.5150E−06 | −4.6619E−08 | 2.1480E−08 | −9.8083E−10 | 1.5025E−11 |

Figure 4A:
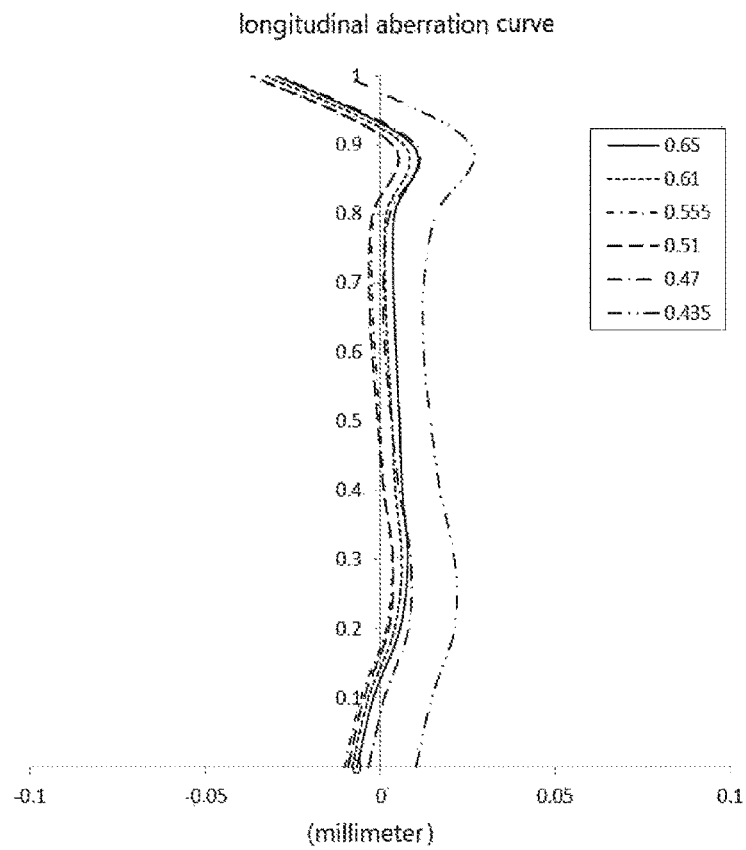
FIGS. 4A to 4D show an longitudinal aberration curve, an astigmatism curve, a distortion curve and a lateral color curve of the optical imaging lens of embodiment 2, respectively.
Figure 4B:
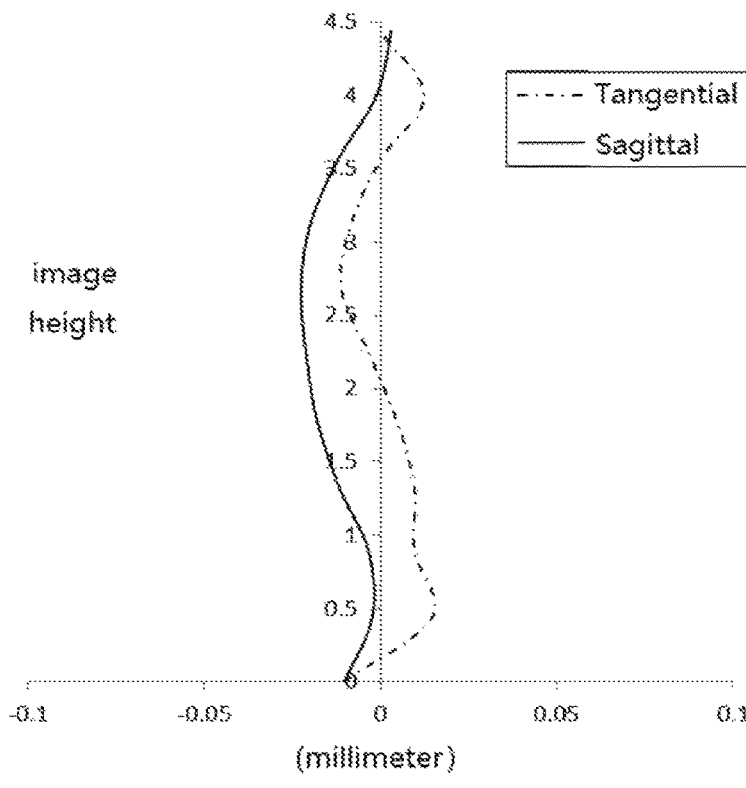
Figure 4C:
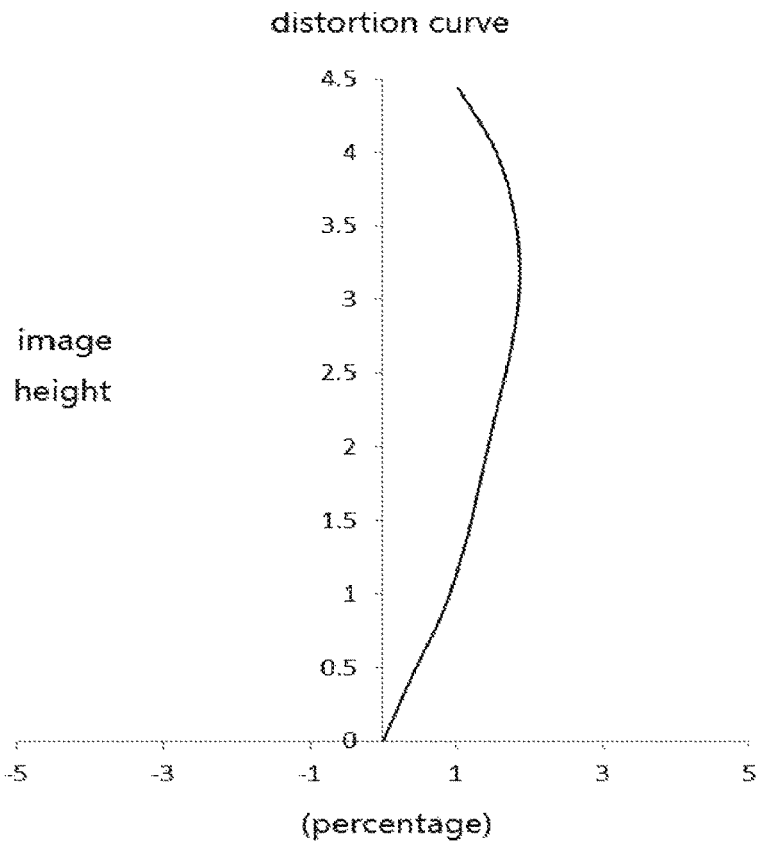
Figure 4D:
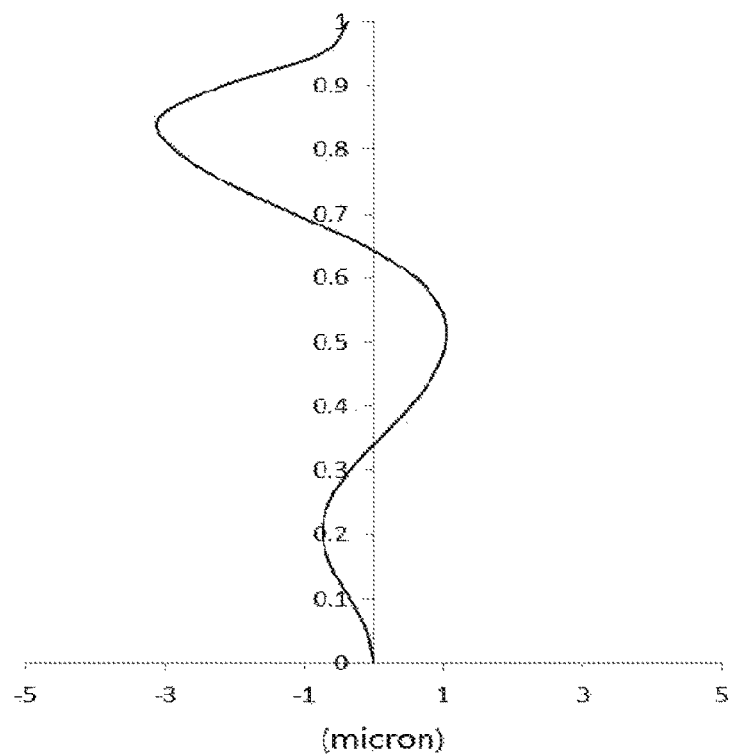

FIG. 4A shows an longitudinal aberration curve of the optical imaging lens of embodiment 2, which indicates the deviations of light of different wavelengths from a convergent focus point after passing through the lens. FIG. 4B shows anastigmatic curve of the optical imaging lens of embodiment 2, which indicates a meridian image plane curvature and a sagittal image plane curvature. FIG. 4C shows a distortion curve of the optical imaging lens of embodiment 2, which indicates distortion magnitude values corresponding to different image heights. FIG. 4D shows the lateral color curve of the optical imaging lens of embodiment 2, which indicates the deviation of different image heights on the imaging surface of light passing through the lens. It can be seen from FIGS. 4A to 4D that, the optical imaging lens provided in embodiment 2 can achieve good imaging quality.

Embodiment 3

Figure 5:
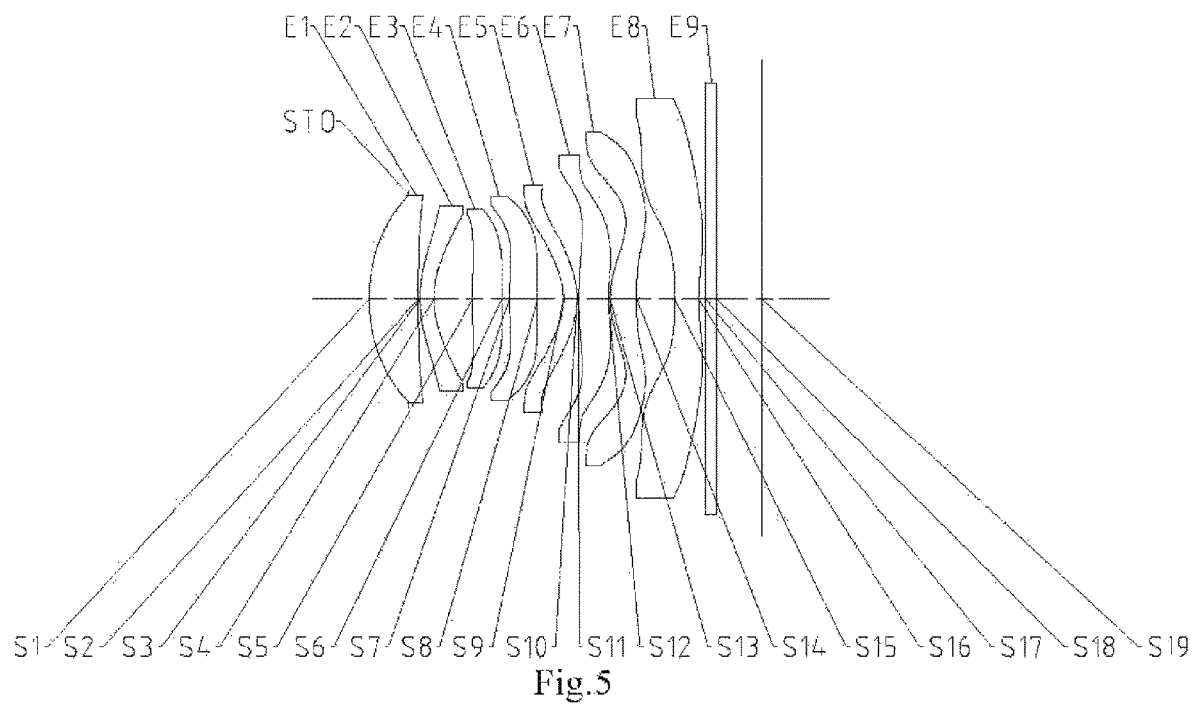
FIG. 5 shows a schematic structural diagram of an optical imaging lens according to embodiment 3 of the disclosure.

The optical imaging lens according to embodiment 3 of the disclosure is described below with reference to FIGS. 5 to 6D. FIG. 5 shows a schematic structural diagram of an optical imaging lens according to embodiment 3 of the disclosure.

As shown in FIG. 5, the optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive focal power, with an object side surface S1 being a convex surface and an image side surface S2 being a convex surface. The second lens E2 has a negative focal power, with an object side surface S3 being a convex surface and an image side surface S4 being a concave surface. The third lens E3 has a negative focal power, with an object side surface S5 being a convex surface and an image side surface S6 being a concave surface. The fourth lens E4 has a positive focal power, with an object side surface S7 being a convex surface and an image side surface S8 being a convex surface. The fifth lens E5 has a negative focal power, with an object side surface S9 being a concave surface and an image side surface S10 being a convex surface. The sixth lens E6 has a negative focal power, with an object side surface S11 being a convex surface and an image side surface S12 being a concave surface. The seventh lens E7 has a positive focal power, with an object side surface S13 being a convex surface and an image side surface S14 being a concave surface. The eighth lens E8 has a negative focal power, with an object side surface S15 being a concave surface and an image side surface S16 being a concave surface. The filter E9 has an object side surface S17 and an image side surface S18. Light from the object passes sequentially through the respective surfaces S1 to S18 and is finally imaged on an imaging surface S19.

In the embodiment, the total effective focal length f of the optical imaging lens is 5.42 mm, and the maximum FOV of the optical imaging lens is 78.1°.

Table 5 shows a basic parameter table of the optical imaging lens of embodiment 3, wherein, the units of curvature radius, thickness/distance, and focal length are millimeters (mm).

TABLE 5

| Surface Number | Surface Types | Curvature radius | Thickness/ Distance | Materials | | Focal Length | Conic coefficient |
| | | | | Refractive index | Abbe number | | |
|---|---|---|---|---|---|---|---|
| OBJ | Sphere | Infinity | Infinity | | | | |
| STO | Sphere | Infinity | −0.7374 | | | | |
| S1 | Aspheric Surface | 3.1669 | 0.9142 | 1.546 | 56.11 | 5.58 | 0.0000 |
| S2 | Aspheric Surface | −72.0748 | 0.0300 | | | | 0.0000 |
| S3 | Aspheric Surface | 2.2839 | 0.2600 | 1.678 | 19.25 | −10.13 | 0.0311 |
| S4 | Aspheric Surface | 1.6348 | 0.7222 | | | | −0.0799 |
| S5 | Aspheric Surface | 19.5499 | 0.5491 | 1.546 | 56.11 | −394.82 | 0.0000 |
| S6 | Aspheric Surface | 17.7463 | 0.1387 | | | | 0.0000 |

TABLE 5-continued

| | | | | Materials | | | |
|---|---|---|---|---|---|---|---|
| Surface Number | Surface Types | Curvature radius | Thickness/ Distance | Refractive index | Abbe number | Focal Length | Conic coefficient |
| S7 | Aspheric Surface | 5.8664 | 0.5250 | 1.546 | 56.11 | 9.49 | 1.1632 |
| S8 | Aspheric Surface | −42.8616 | 0.4837 | | | | 0.0000 |
| S9 | Aspheric Surface | −1.1340 | 0.2500 | 1.678 | 19.25 | −15.67 | −0.9926 |
| S10 | Aspheric Surface | −1.3828 | 0.0300 | | | | −1.0152 |
| S11 | Aspheric Surface | 6.6625 | 0.5638 | 1.546 | 56.11 | −8.58 | −4.5684 |
| S12 | Aspheric Surface | 2.6679 | 0.0316 | | | | −0.1292 |
| S13 | Aspheric Surface | 1.6435 | 0.4960 | 1.546 | 56.11 | 3.11 | −0.9969 |
| S14 | Aspheric Surface | 46.6866 | 0.7149 | | | | −32.0000 |
| S15 | Aspheric Surface | −7.2175 | 0.4400 | 1.546 | 56.11 | −4.67 | 1.7172 |
| S16 | Aspheric Surface | 4.0237 | 0.1330 | | | | 0.0000 |
| S17 | Sphere | Infinity | 0.2100 | 1.517 | 64.17 | | 0.0000 |
| S18 | Sphere | Infinity | 0.8379 | | | | |
| S19 | Sphere | Infinity | | | | | |

In embodiment 3, both the object side surface and the image side surface of any one of the first lens E1 to the eighth lens E8 are aspheric surfaces. The higher order term coefficients $A_4$, $A_6$, $A_8$, $A_{10}$, $A_{12}$, $A_{14}$, $A_{16}$, $A_{18}$ and $A_{20}$ that can be used for each of aspherical mirror surfaces S1-S16 in embodiment 3 are given in Table 6 below.

TABLE 6

| Surface Number | A4 | A6 | A8 | A10 | A12 | A14 | A16 | A18 | A20 |
|---|---|---|---|---|---|---|---|---|---|
| S1 | 4.8328E−03 | −1.2952E−04 | −5.9973E−04 | 7.6032E−04 | −3.4274E−04 | 8.0578E−05 | −1.0333E−05 | 1.0549E−06 | −1.1047E−07 |
| S2 | 2.6555E−02 | −1.4593E−02 | 7.3388E−03 | −2.9249E−03 | 8.0922E−04 | −1.3392E−04 | 9.4573E−06 | 0.0000E+00 | 0.0000E+00 |
| S3 | −6.6006E−02 | 2.8973E−02 | −2.5578E−02 | 1.6488E−02 | −7.8692E−03 | 2.5445E−03 | −4.8669E−04 | 4.1364E−05 | 0.0000E+00 |
| S4 | −1.0759E−01 | 5.1774E−02 | −4.9830E−02 | 3.8882E−02 | −2.7163E−02 | 1.4562E−02 | −5.3359E−03 | 1.1499E−03 | −1.1059E−04 |
| S5 | −1.9127E−01 | 1.4852E−01 | −3.5209E−01 | 4.8694E−02 | −4.5552E−02 | 2.7117E−02 | −9.8904E−03 | 2.0067E−03 | −1.7351E−04 |
| S6 | −7.6017E−02 | 2.6361E−02 | −5.0251E−02 | 6.4074E−02 | −4.8936E−02 | 2.3748E−02 | −7.1791E−03 | 1.2192E−03 | −8.7940E−05 |
| S7 | −6.9459E−02 | 1.7043E−02 | −6.5527E−02 | 8.2842E−02 | −6.1553E−02 | 3.1020E−02 | −1.0136E−02 | 1.8654E−03 | −1.4312E−04 |
| S8 | −5.1940E−03 | −1.2268E−02 | −1.1314E−02 | 8.0773E−03 | 5.5722E−04 | −2.3736E−03 | 1.0210E−03 | −1.8993E−04 | 1.3706E−05 |
| S9 | 2.3066E−01 | −1.9181E−01 | 9.7164E−02 | −1.3197E−02 | −1.3365E−02 | 8.8561E−03 | −2.4370E−03 | 3.2975E−04 | −1.7953E−05 |
| S10 | 1.9623E−01 | −1.8412E−01 | 1.0204E−01 | −2.6821E−02 | −5.4116E−04 | 2.6719E−03 | −8.1725E−04 | 1.0991E−04 | −5.7776E−06 |
| S11 | −1.9330E−02 | 1.5426E−02 | −2.4771E−02 | 1.8351E−02 | −8.2326E−03 | 2.2693E−03 | −3.7267E−04 | 3.3419E−05 | −1.2573E−06 |
| S12 | −3.0639E−01 | 2.4843E−01 | −1.5628E−01 | 6.6684E−02 | −1.9061E−02 | 3.5649E−03 | −4.1376E−04 | 2.6840E−05 | −7.4118E−07 |
| S13 | −1.2398E−01 | 8.0303E−02 | −6.1791E−02 | 2.6568E−02 | −6.8145E−03 | 1.0806E−03 | −1.0342E−04 | 5.4592E−06 | −1.2187E−07 |
| S14 | 1.8072E−01 | −1.4167E−01 | 5.2347E−02 | −1.2346E−02 | 2.0569E−03 | −2.4567E−04 | 1.9856E−05 | −9.5598E−07 | 2.0405E−08 |
| S15 | −2.4604E−02 | −3.4213E−02 | 2.4788E−02 | −6.9473E−03 | 1.0878E−03 | −1.0366E−04 | 5.9927E−06 | −1.9366E−07 | 2.6840E−09 |
| S16 | −6.1458E−02 | 5.4356E−04 | 5.8315E−03 | −1.9504E−03 | 3.2042E−04 | −3.0595E−05 | 1.7229E−06 | −5.3159E−08 | 6.9373E−10 |

Figure 6A:
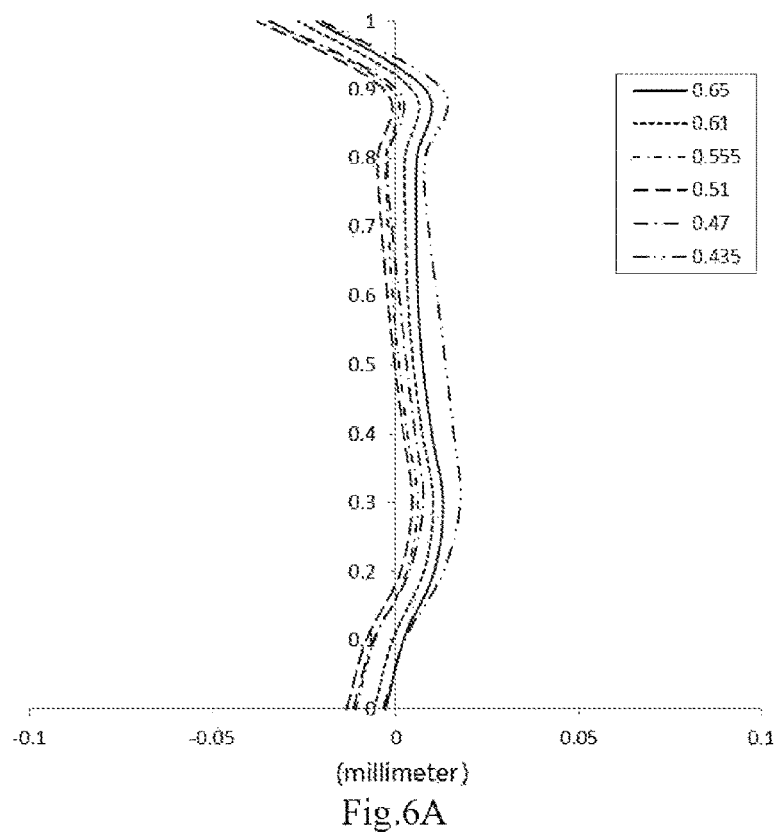
FIGS. 6A to 6D show an longitudinal aberration curve, an astigmatism curve, a distortion curve and a lateral color curve of the optical imaging lens of embodiment 3, respectively.
Figure 6B:
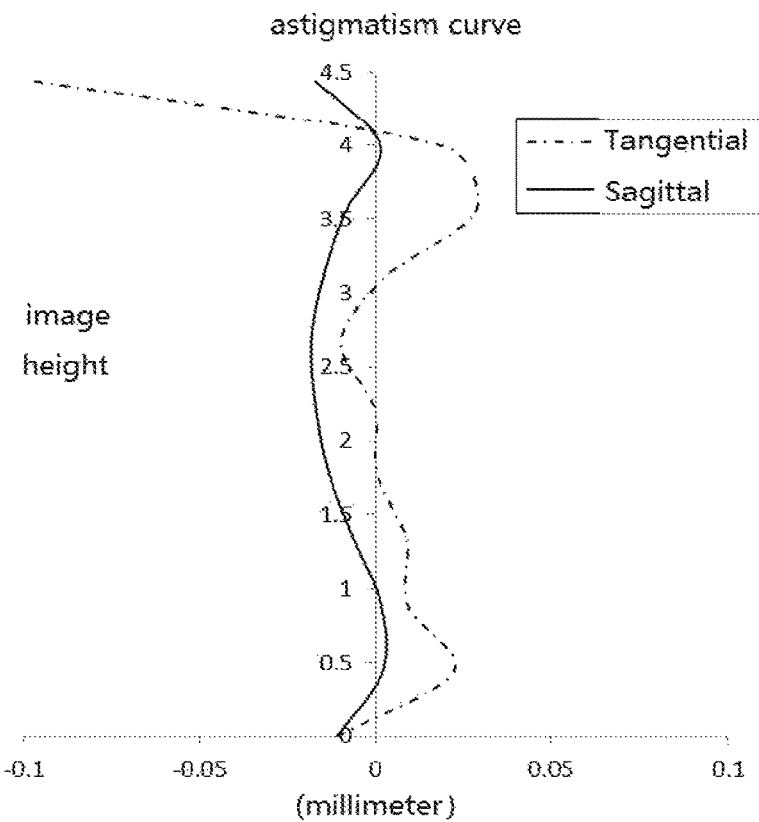
Figure 6C:
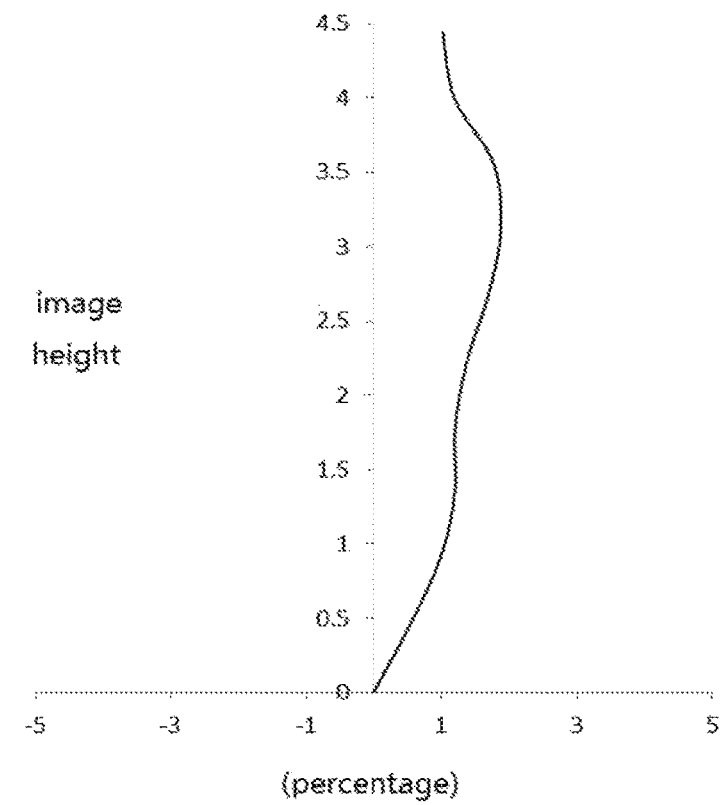
Figure 6D:
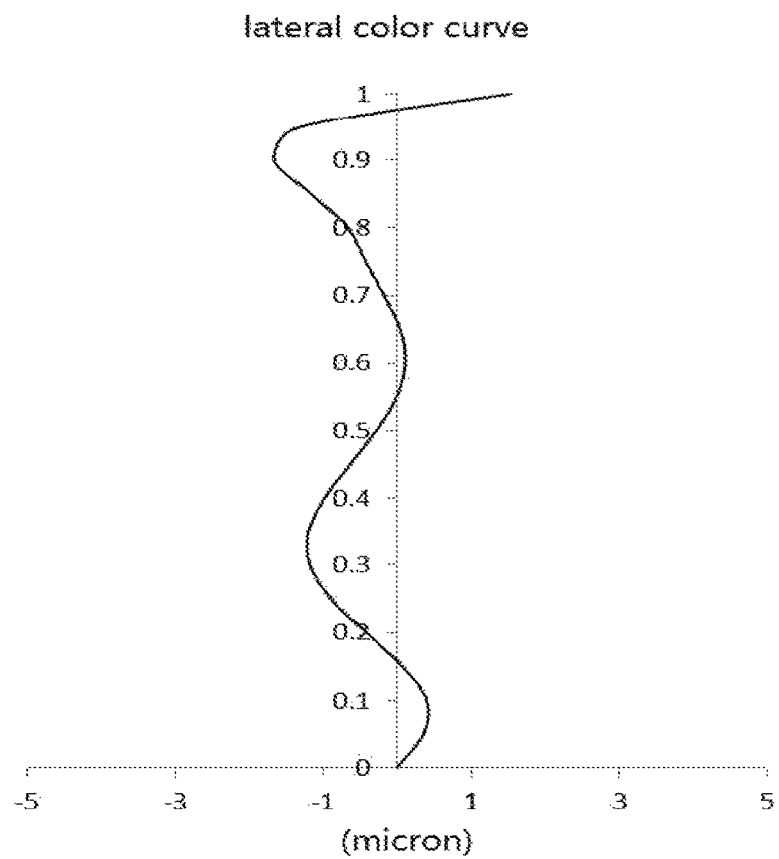

FIG. 6A shows an longitudinal aberration curve of the optical imaging lens of embodiment 3, which indicates the deviations of light of different wavelengths from a convergent focus point after passing through the lens. FIG. 6B shows anastigmatic curve of the optical imaging lens of embodiment 3, which indicates a meridian image plane curvature and a sagittal image plane curvature. FIG. 6C shows a distortion curve of the optical imaging lens of embodiment 3, which indicates distortion magnitude values corresponding to different image heights. FIG. 6D shows the lateral color curve of the optical imaging lens of embodiment 3, which indicates the deviation of different image heights on the imaging surface of light passing through the lens. It can be seen from FIGS. 6A to 6D that, the optical imaging lens provided in embodiment 3 can achieve good imaging quality.

Embodiment 4

Figure 7:
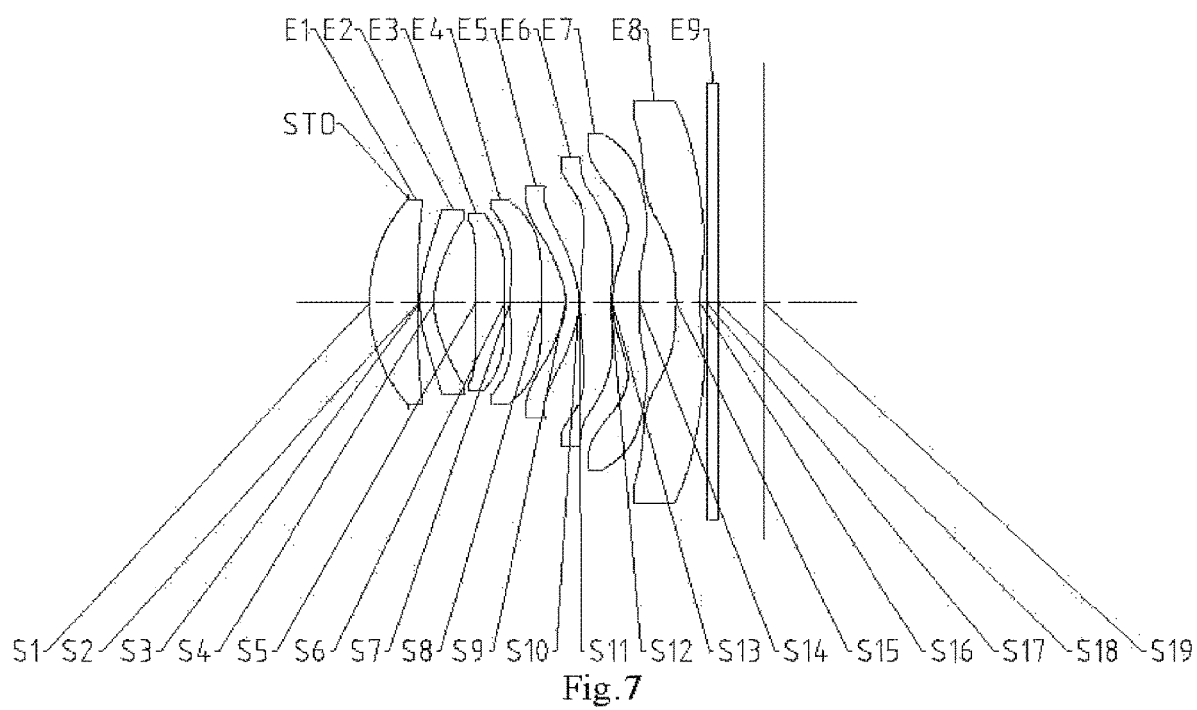
FIG. 7 shows a schematic structural diagram of an optical imaging lens according to embodiment 4 of the disclosure.

The optical imaging lens according to embodiment 4 of the disclosure is described below with reference to FIGS. 7 to 8D. FIG. 7 shows a schematic structural diagram of an optical imaging lens according to embodiment 4 of the disclosure.

As shown in FIG. 7, the optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E, an eighth lens E8, a filter E9, and an imaging surface 319.

The first lens E1 has a positive focal power, with an object side surface S1 being a convex surface and an image side surface S2 being a convex surface. The second lens E2 has a negative focal power, with an object side surface S3 being a convex surface and an image side surface S4 being a concave surface. The third lens E3 has a negative focal power, with an object side surface S5 being a convex surface and an image side surface S6 being a concave surface. The fourth lens E4 has a positive focal power, with an object side surface S7 being a convex surface and an image side surface S8 being a convex surface. The fifth lens E5 has a negative focal power, with an object side surface S9 being a concave surface and an image side surface S10 being a convex surface. The sixth lens E6 has a negative focal power, with an object side surface S11 being a convex surface and an image side surface S12 being a concave surface. The seventh lens E7 has a positive focal power, with an object side surface S13 being a convex surface and an image side surface S14 being a convex surface. The eighth lens E8 has a negative focal power, with an object side surface S15 being a concave surface and an image side surface S16 being a concave surface. The filter E9 has an object side surface S17 and an image side surface S18. Light from the object passes sequentially through the respective surfaces S1 to S18 and is finally imaged on an imaging surface S19.

In the embodiment, the total effective focal length f of the optical imaging lens is 5.37 mm, and the maximum FOV of the optical imaging lens is 78.6°.

Table 7 shows a basic parameter table of the optical imaging lens of embodiment 4, wherein, the units of curvature radius, thickness/distance, and focal length are millimeters (mm).

Figure 8A:
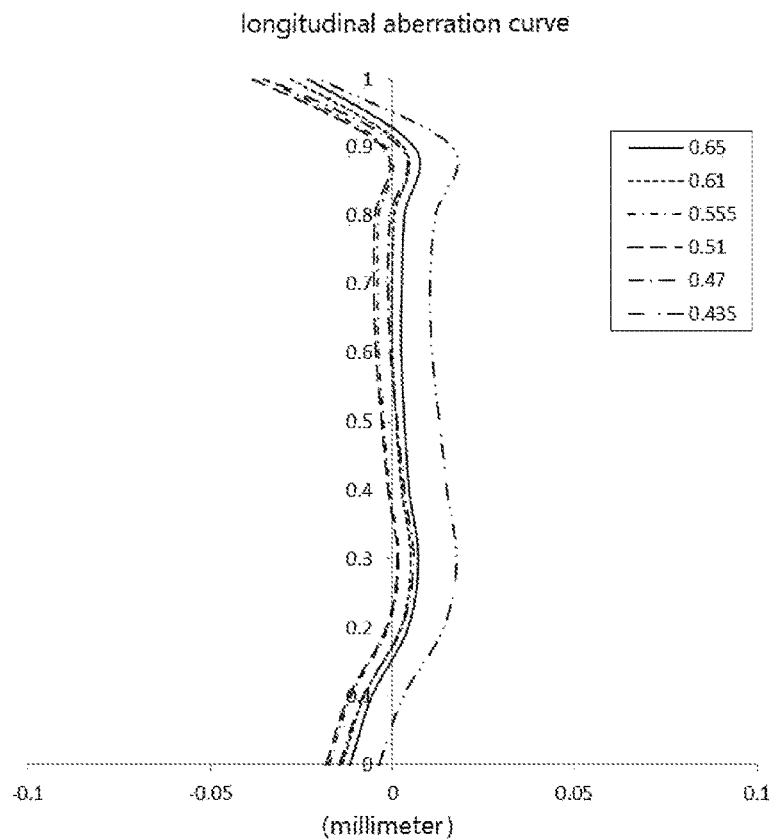
FIGS. 8A to 8D show an longitudinal aberration curve, an astigmatism curve, a distortion curve and a lateral color curve of the optical imaging lens of embodiment 4, respectively.
Figure 8B:
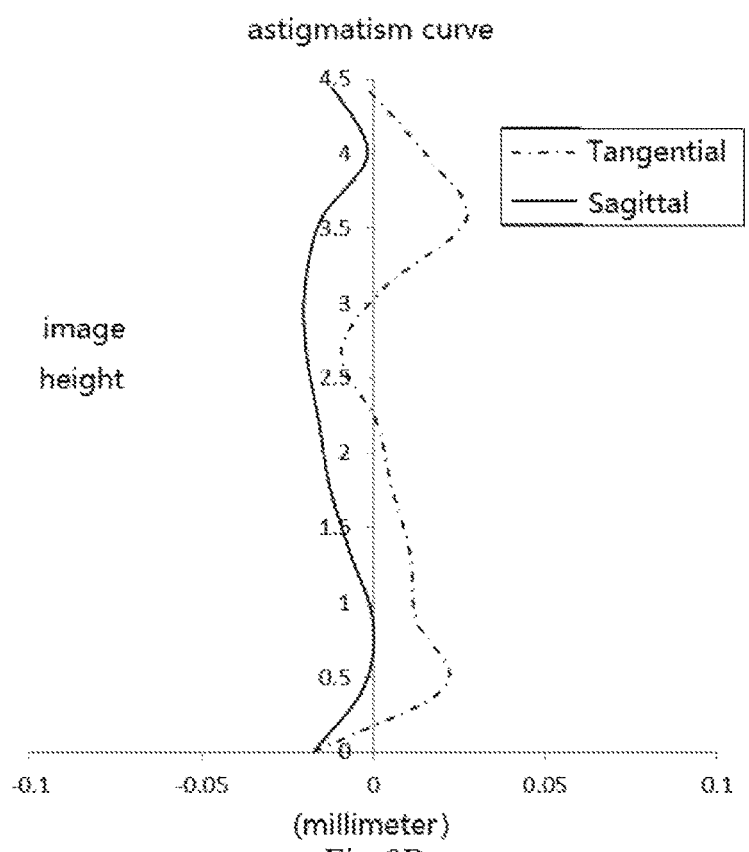
Figure 8C:
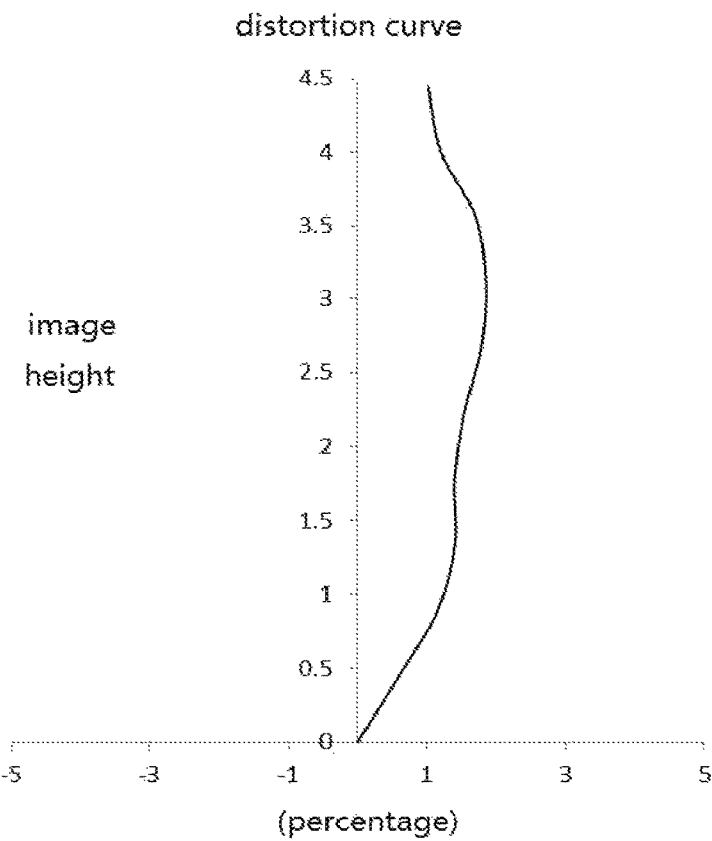
Figure 8D:
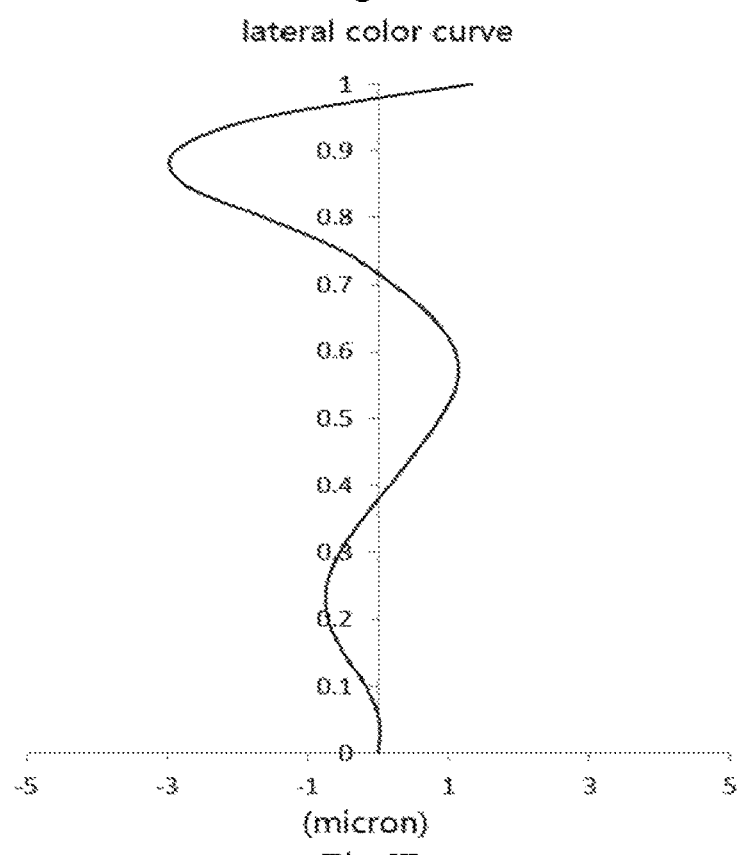

FIG. 8A shows an longitudinal aberration curve of the optical imaging lens of embodiment 4, which indicates the deviations of light of different wavelengths from a convergent focus point after passing through the lens. FIG. 8B shows anastigmatic curve of the optical imaging lens of embodiment 4, which indicates a meridian image plane curvature and a sagittal image plane curvature. FIG. 8C shows a distortion curve of the optical imaging lens of embodiment 4, which indicates distortion magnitude values corresponding to different image heights. FIG. 8D shows the lateral color curve of the optical imaging lens of embodi-

TABLE 7

| Surface Number | Surface Types | Curvature radius | Thickness/ Distance | Materials | | Focal Length | Conic coefficient |
|---|---|---|---|---|---|---|---|
| | | | | Refractive index | Abbe number | | |
| OBJ | Sphere | Infinity | Infinity | | | | |
| STO | Sphere | Infinity | −0.7232 | | | | |
| S1 | Aspheric Surface | 3.1394 | 0.9062 | 1.546 | 56.11 | 5.45 | 0.0000 |
| S2 | Aspheric Surface | −50.7313 | 0.0300 | | | | 0.0000 |
| S3 | Aspheric Surface | 2.2612 | 0.2600 | 1.678 | 19.25 | −10.10 | 0.0597 |
| S4 | Aspheric Surface | 1.6206 | 0.7707 | | | | −0.0706 |
| S5 | Aspheric Surface | 46.9883 | 0.5389 | 1.546 | 56.11 | −108.73 | 0.0000 |
| S6 | Aspheric Surface | 26.1207 | 0.1059 | | | | 0.0000 |
| S7 | Aspheric Surface | 6.5356 | 0.5900 | 1.546 | 56.11 | 8.76 | 3.0504 |
| S8 | Aspheric Surface | −17.2571 | 0.4360 | | | | 0.0000 |
| S9 | Aspheric Surface | −1.1331 | 0.2500 | 1.678 | 19.25 | −14.61 | −0.9929 |
| S10 | Aspheric Surface | −1.3936 | 0.0300 | | | | −1.0247 |
| S11 | Aspheric Surface | 6.7439 | 0.5726 | 1.560 | 44.17 | −8.43 | −3.4120 |
| S12 | Aspheric Surface | 2.6989 | 0.0300 | | | | −0.1219 |
| S13 | Aspheric Surface | 1.6582 | 0.5006 | 1.546 | 56.11 | 3.03 | −0.9881 |
| S14 | Aspheric Surface | −375.8401 | 0.6832 | | | | 5.0000 |
| S15 | Aspheric Surface | −6.5312 | 0.4400 | 1.546 | 56.11 | −4.49 | 1.5703 |
| S16 | Aspheric Surface | 4.0132 | 0.1359 | | | | 0.0000 |
| S17 | Sphere | Infinity | 0.2100 | 1.517 | 64.17 | | 0.0000 |
| S18 | Sphere | Infinity | 0.8400 | | | | |
| S19 | Sphere | Infinity | | | | | |

In embodiment 4, both the object side surface and the image side surface of any one of the first lens E1 to the eighth lens E8 are aspheric surfaces. The higher order term coefficients $A_4$, $A_6$, $A_8$, $A_{10}$, $A_{12}$, $A_{14}$, $A_{16}$, $A_{18}$ and $A_{20}$ that can be used for each of aspherical mirror surfaces S1-S16 in embodiment 4 are given in Table 8 below.

ment 4, which indicates the deviation of different image heights on the imaging surface of light passing through the lens. It can be seen from FIGS. 8A to 8D that, the optical imaging lens provided in embodiment 4 can achieve good imaging quality.

TABLE 8

| Surface Number | A4 | A6 | A8 | A10 | A12 | A14 | A16 | A18 | A20 |
|---|---|---|---|---|---|---|---|---|---|
| S1 | 4.5743E−03 | 6.3667E−05 | −1.0265E−03 | 1.0763E−03 | −4.6031E−04 | 1.0346E−04 | −1.2613E−05 | 1.2601E−06 | −1.3550E−07 |
| S2 | 2.7067E−02 | −1.6333E−02 | 9.3379E−03 | −3.9735E−03 | 1.1095E−03 | −1.7789E−04 | 1.1888E−05 | 0.0000E+00 | 0.0000E+00 |
| S3 | −6.4651E−02 | 3.0389E−02 | −3.0090E−02 | 2.3806E−02 | −1.3548E−02 | 4.9057E−03 | −1.0026E−03 | 8.7779E−05 | 0.0000E+00 |
| S4 | −1.0621E−01 | 5.3047E−02 | −5.1687E−02 | 3.9829E−02 | −2.5506E−02 | 1.2069E−02 | −4.0051E−03 | 8.2562E−04 | −8.1559E−05 |
| S5 | −1.8351E−02 | 1.3685E−02 | −3.9771E−02 | 6.1537E−02 | −6.2413E−02 | 3.9842E−02 | −1.5536E−02 | 3.3777E−03 | −3.1397E−04 |
| S6 | −8.0243E−02 | 2.9239E−02 | −6.0891E−02 | 8.8060E−02 | −7.5135E−02 | 3.9491E−02 | −1.2608E−02 | 2.2374E−03 | −1.6878E−04 |
| S7 | −7.8256E−02 | 3.0755E−02 | −9.3437E−02 | 1.3230E−01 | −1.0775E−01 | 5.4737E−02 | −1.7022E−02 | 2.9368E−03 | −2.1306E−04 |
| S8 | −1.0313E−02 | −7.1833E−03 | −2.4278E−02 | 2.8163E−02 | −1.4292E−02 | 3.6020E−03 | −3.3502E−04 | −2.7031E−05 | 5.7017E−06 |
| S9 | 2.4341E−01 | −2.1788E−01 | 1.3181E−01 | −4.1105E−02 | 1.2182E−03 | 3.7472E−03 | −1.2943E−03 | 1.8503E−04 | −1.0142E−05 |
| S10 | 2.0360E−01 | −1.8785E−01 | 1.1739E−01 | −4.6232E−02 | 1.1224E−02 | −1.4481E−03 | 3.3666E−05 | 1.3991E−05 | −1.2349E−06 |
| S11 | −3.3541E−02 | 3.8486E−02 | −3.7064E−02 | 2.0620E−02 | −7.6914E−03 | 1.9038E−03 | −2.9639E−04 | 2.6121E−05 | −9.8698E−07 |
| S12 | −3.1677E−01 | 2.5815E−01 | −1.5543E−01 | 6.2656E−02 | −1.6914E−02 | 3.0037E−03 | −3.3361E−04 | 2.0866E−05 | −5.5921E−07 |
| S13 | −1.3380E−01 | 9.7729E−02 | −7.4212E−02 | 3.0068E−02 | −7.0833E−03 | 1.0216E−03 | −8.9105E−05 | 4.3179E−06 | −8.9257E−08 |
| S14 | 1.8239E−01 | −1.3095E−01 | 3.9544E−02 | −6.4649E−03 | 6.4514E−04 | −4.9121E−05 | 3.6925E−06 | −2.2007E−07 | 5.9924E−09 |
| S15 | −2.2843E−02 | −3.4780E−02 | 2.4815E−02 | −6.8028E−03 | 1.0377E−03 | −9.6634E−05 | 5.5054E−06 | −1.7718E−07 | 2.4709E−09 |
| S16 | −5.7651E−02 | −3.3443E−03 | 8.0060E−03 | −2.5958E−03 | 4.3024E−04 | −4.1745E−05 | 2.3907E−06 | −7.4896E−08 | −9.8991E−10 |

Embodiment 5

Figure 9:
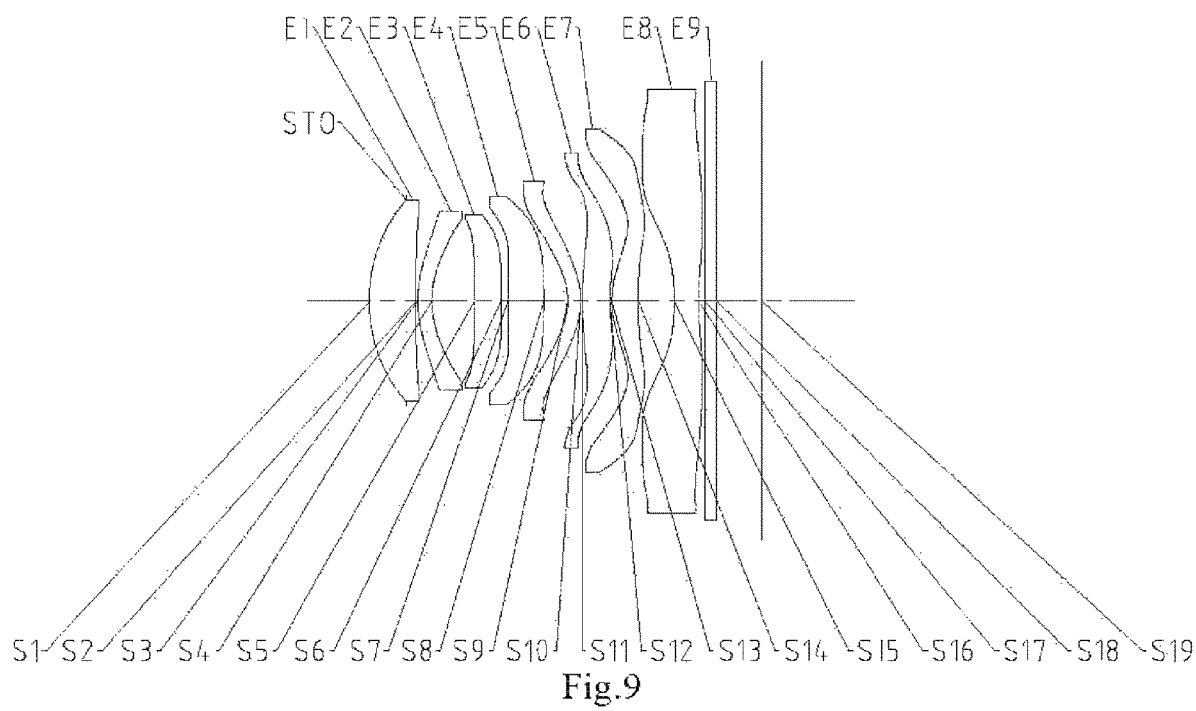
FIG. 9 shows a schematic structural diagram of an optical imaging lens according to embodiment 5 of the disclosure.

The optical imaging lens according to embodiment 5 of the disclosure is described below with reference to FIGS. 9 to 10D. FIG. 9 shows a schematic structural diagram of an optical imaging lens according to embodiment 5 of the disclosure.

As shown in FIG. 9, the optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9, and an imaging surface 319.

The first lens E1 has a positive focal power, with an object side surface S1 being a convex surface and an image side surface S2 being a convex surface. The second lens E2 has a negative focal power, with an object side surface S3 being a convex surface and an image side surface S4 being a concave surface. The third lens E3 has a negative focal power, with an object side surface S5 being a concave surface and an image side surface S6 being a concave surface. The fourth lens E4 has a positive focal power, with an object side surface S7 being a convex surface and an image side surface S8 being a convex surface. The fifth lens E5 has a negative focal power, with an object side surface S9 being a concave surface and an image side surface S10 being a convex surface. The sixth lens E6 has a negative focal power, with an object side surface S11 being a convex surface and an image side surface S12 being a concave surface. The seventh lens E7 has a positive focal power, with an object side surface S13 being a convex surface and an image side surface S14 being a convex surface. The eighth lens E8 has a negative focal power, with an object side surface S15 being a concave surface and an image side surface S16 being a concave surface. The filter E9 has an object side surface S17 and an image side surface S18. Light from the object passes sequentially through the respective surfaces S1 to S18 and is finally imaged on an imaging surface S19.

In the embodiment, the total effective focal length f of the optical imaging lens is 5.24 mm, and the maximum FOV of the optical imaging lens is 79.9°.

Table 9 shows a basic parameter table of the optical imaging lens of embodiment 5, wherein, the units of curvature radius, thickness/distance, and focal length are millimeters (mm).

TABLE 9

| Surface Number | Surface Types | Curvature radius | Thickness/ Distance | Materials Refractive index | Abbe number | Focal Length | Conic coefficient |
|---|---|---|---|---|---|---|---|
| OBJ | Sphere | Infinity | Infinity | | | | |
| STO | Sphere | Infinity | −0.6812 | | | | |
| S1 | Aspheric Surface | 3.1294 | 0.8664 | 1.546 | 56.11 | 5.34 | 0.0000 |
| S2 | Aspheric Surface | −38.9655 | 0.0300 | | | | 0.0000 |
| S3 | Aspheric Surface | 2.2349 | 0.2576 | 1.678 | 19.25 | −9.89 | 0.0674 |
| S4 | Aspheric Surface | 1.5978 | 0.7940 | | | | −0.0592 |
| S5 | Aspheric Surface | −91.5532 | 0.4953 | 1.546 | 56.11 | −42.97 | 0.0000 |
| S6 | Aspheric Surface | 31.5973 | 0.1226 | | | | 0.0000 |
| S7 | Aspheric Surface | 6.6300 | 0.6691 | 1.546 | 56.11 | 8.23 | 2.3962 |
| S8 | Aspheric Surface | −13.4286 | 0.4452 | | | | 0.0000 |
| S9 | Aspheric Surface | −1.0810 | 0.2387 | 1.678 | 19.25 | −12.96 | −0.9963 |
| S10 | Aspheric Surface | −1.3428 | 0.0300 | | | | −1.0217 |
| S11 | Aspheric Surface | 5.9068 | 0.5251 | 1.558 | 45.11 | −9.83 | −0.0721 |
| S12 | Aspheric Surface | 2.7606 | 0.0326 | | | | −0.1098 |
| S13 | Aspheric Surface | 1.5942 | 0.4963 | 1.546 | 56.11 | 2.88 | −1.0305 |
| S14 | Aspheric Surface | −91.1723 | 0.6618 | | | | 5.0000 |
| S15 | Aspheric Surface | −4.3151 | 0.4500 | 1.546 | 56.11 | −4.17 | −0.3484 |
| S16 | Aspheric Surface | 4.9984 | 0.1303 | | | | 0.0000 |
| S17 | Sphere | Infinity | 0.2100 | 1.517 | 64.17 | 0.0000 | |
| S18 | Sphere | Infinity | 0.8400 | | | | |
| S19 | Sphere | Infinity | | | | | |

In embodiment 5, both the object side surface and the image side surface of any one of the first lens E1 to the eighth lens E8 are aspheric surfaces. The higher order term coefficients $A_4$, $A_6$, $A_8$, $A_{10}$, $A_{12}$, $A_{14}$, $A_{16}$, $A_{18}$ and $A_{20}$ that can be used for each of aspherical mirror surfaces S1-S16 in embodiment 5 are given in Table 10 below.

TABLE 10

| Surface Number | A4 | A6 | A8 | A10 | A12 | A14 | A16 | A18 | A20 |
|---|---|---|---|---|---|---|---|---|---|
| S1 | 4.6659E−03 | 7.1983E−04 | −2.0823E−03 | 1.9700E−03 | −8.6628E−04 | 2.0098E−04 | −2.4440E−05 | 2.2932E−06 | −2.7826E−07 |
| S2 | 3.0859E−02 | −2.1200E−02 | 1.3422E−02 | −6.1452E−03 | 1.7976E−03 | −2.9640E−04 | 1.9840E−05 | 0.0000E+00 | 0.0000E+00 |
| S3 | −6.3652E−02 | 3.4438E−02 | −4.0374E−02 | 3.6579E−02 | −2.2644E−02 | 8.6413E−03 | −1.8321E−03 | 1.6510E−04 | 0.0000E+00 |
| S4 | −1.0883E−01 | 6.2702E−02 | −6.8921E−02 | 5.7779E−02 | −3.6272E−02 | 1.5185E−02 | −4.1288E−03 | 6.8897E−04 | −6.1588E−05 |
| S5 | −2.2645E−02 | 1.8457E−02 | −4.2558E−02 | 6.1298E−02 | −6.2370E−02 | 4.1568E−02 | −1.7280E−02 | 4.0404E−03 | −4.0523E−04 |
| S6 | −8.8536E−02 | 4.7445E−02 | −6.6569E−02 | 7.7913E−02 | −6.3764E−02 | 3.4195E−02 | −1.1370E−02 | 2.1147E−03 | −1.6729E−04 |
| S7 | −8.8534E−02 | 4.4676E−02 | −8.4597E−02 | 1.0811E−01 | −8.9222E−02 | 4.6997E−02 | −1.5124E−02 | 2.6885E−03 | −2.0044E−04 |
| S8 | −2.1248E−02 | −8.4977E−03 | −9.6736E−03 | 1.4157E−02 | −7.6584E−03 | 1.8003E−03 | −4.8181E−05 | −5.2399E−05 | 6.6984E−06 |

TABLE 10-continued

| Surface Number | A4 | A6 | A8 | A10 | A12 | A14 | A16 | A18 | A20 |
|---|---|---|---|---|---|---|---|---|---|
| S9 | 2.4319E−01 | −2.3891E−01 | 1.7944E−01 | −8.6549E−02 | 2.5476E−02 | −4.1234E−03 | 2.5703E−04 | 1.3636E−05 | −1.9870E−06 |
| S10 | 2.0007E−01 | −2.1021E−01 | 1.6700E−01 | −9.0005E−02 | 3.2752E−02 | −7.9007E−03 | 1.2115E−03 | −1.0659E−04 | 4.0728E−06 |
| S11 | −1.3459E−02 | −9.6408E−03 | 1.1393E−02 | −7.1697E−03 | 2.4109E−03 | −4.7420E−04 | 5.4814E−05 | −3.3917E−06 | 8.4712E−08 |
| S12 | −2.5886E−01 | 1.6233E−01 | −7.8487E−02 | 2.6930E−02 | −6.5812E−03 | 1.1145E−03 | −1.2203E−04 | 7.6548E−06 | −2.0738E−07 |
| S13 | −1.4069E−01 | 8.3079E−02 | −4.9557E−02 | 1.5761E−02 | −2.6771E−03 | 2.3664E−04 | −8.3436E−06 | −1.3184E−07 | 1.2387E−08 |
| S14 | 1.2617E−01 | −7.2883E−02 | 1.1863E−02 | 1.4019E−03 | −8.1117E−04 | 1.3159E−04 | −1.0914E−05 | 4.7242E−07 | −8.4921E−09 |
| S15 | −3.5150E−02 | −2.2400E−04 | 6.3117E−03 | −1.7891E−03 | 2.3250E−04 | −1.6487E−05 | 6.3596E−07 | −1.1531E−08 | 5.4203E−11 |
| S16 | −5.1641E−02 | 1.0035E−02 | 1.4959E−04 | −4.7720E−04 | 9.9569E−05 | −1.0232E−05 | 5.8441E−07 | −1.7733E−08 | 2.2312E−10 |

Figure 10A:
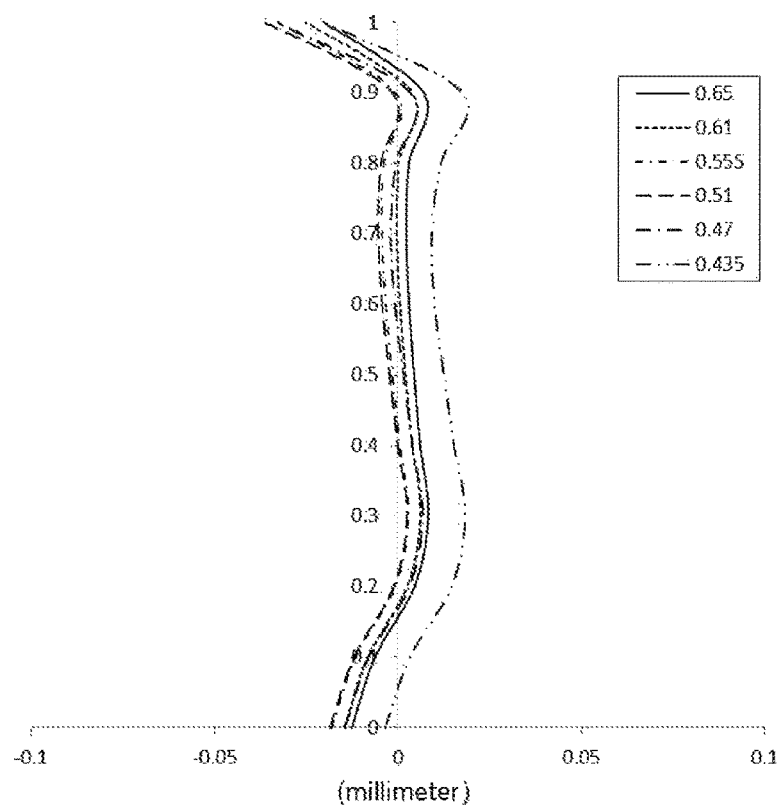
FIGS. 10A to 10D show an longitudinal aberration curve, an astigmatism curve, a distortion curve and a lateral color curve of the optical imaging lens of embodiment 5, respectively.
Figure 10B:
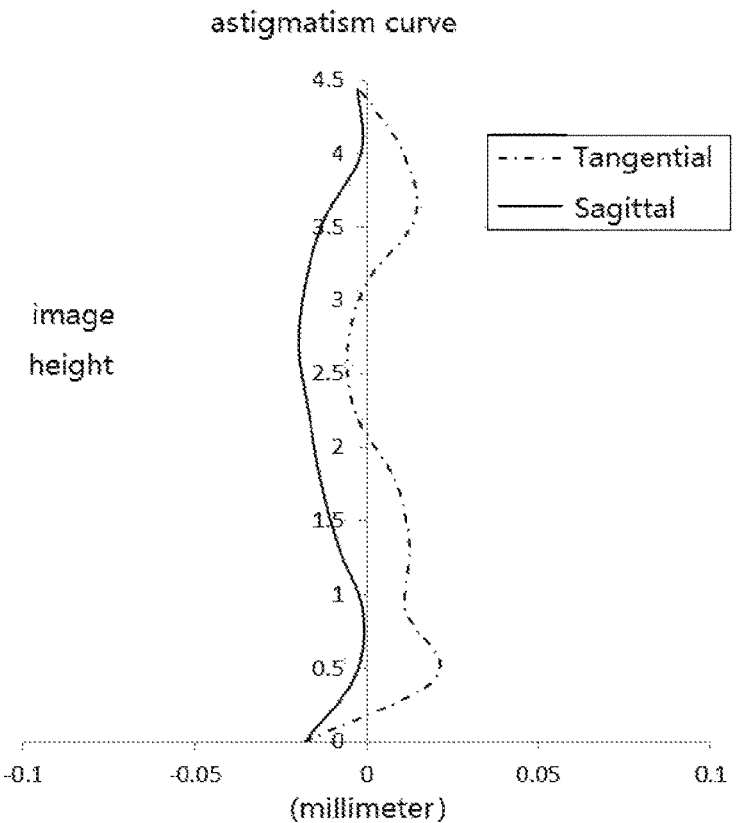
Figure 10C:
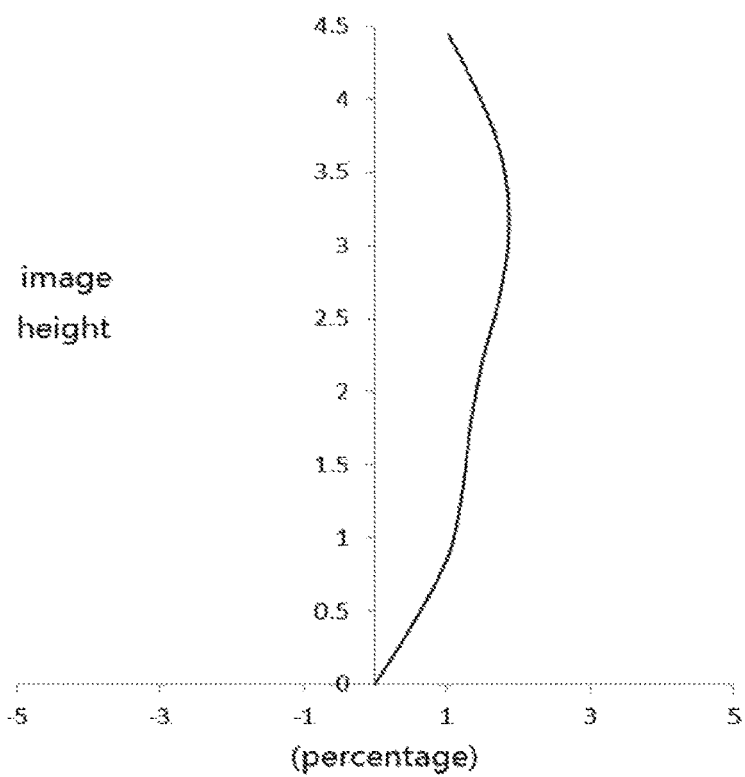
Figure 10D:
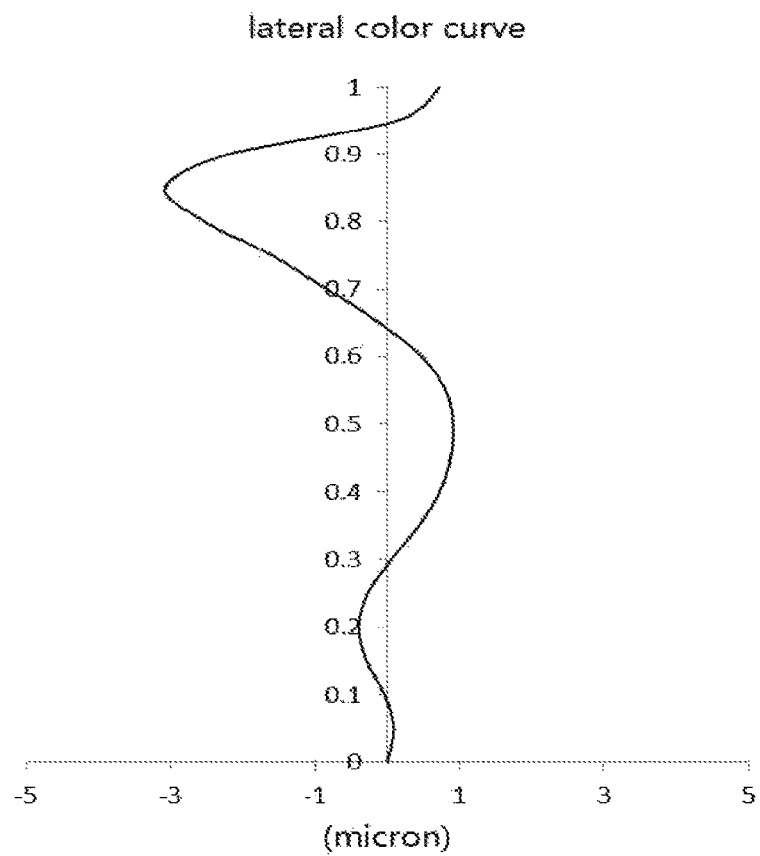

FIG. 10A shows an longitudinal aberration curve of the optical imaging lens of embodiment 5, which indicates the deviations of light of different wavelengths from a convergent focus point after passing through the lens. FIG. 10B shows anastigmatic curve of the optical imaging lens of embodiment 5, which indicates a meridian image plane curvature and a sagittal image plane curvature. FIG. 10C shows a distortion curve of the optical imaging lens of embodiment 5, which indicates distortion magnitude values corresponding to different image heights. FIG. 10D shows the lateral color curve of the optical imaging lens of embodiment 5, which indicates the deviation of different image heights on the imaging surface of light passing through the lens. It can be seen from FIGS. 10A to 10D that, the optical imaging lens provided in embodiment 5 can achieve good imaging quality.

Embodiment 6

Figure 11:
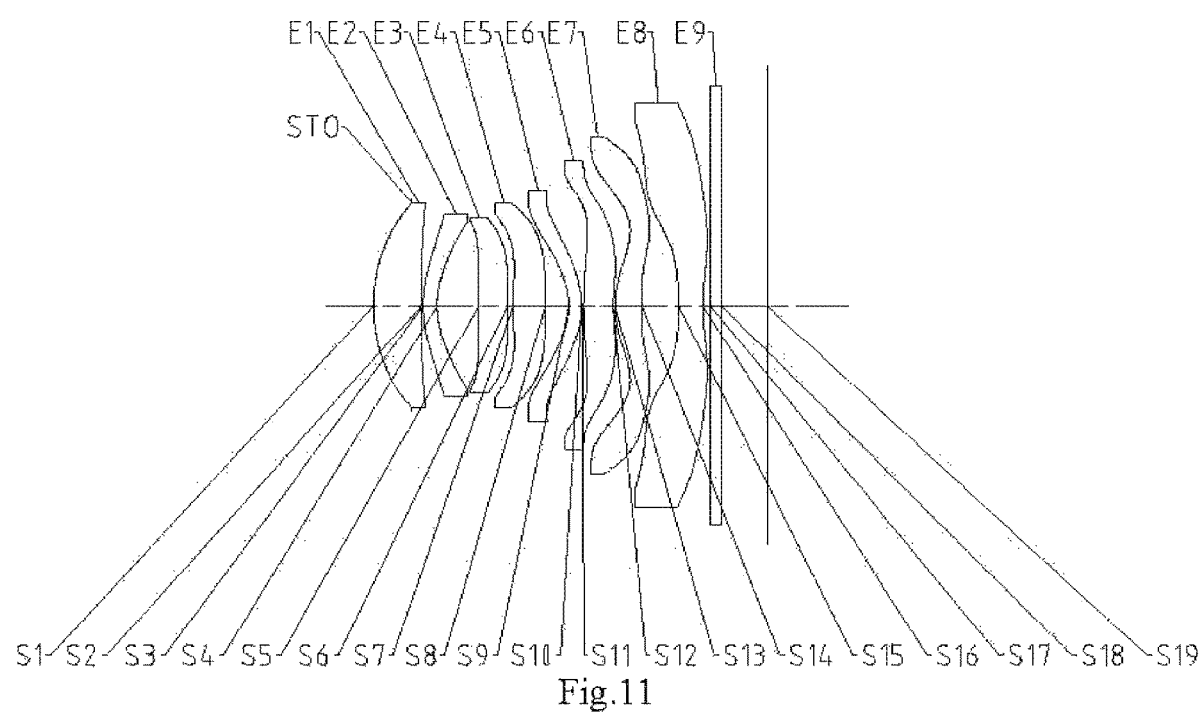
FIG. 11 shows a schematic structural diagram of an optical imaging lens according to embodiment 6 of the disclosure.

The optical imaging lens according to embodiment 6 of the disclosure is described below with reference to FIGS. 11 to 12D. FIG. 11 shows a schematic structural diagram of an optical imaging lens according to embodiment 6 of the disclosure.

As shown in FIG. 11, the optical imaging lens sequentially from an object side to an image side along the optical axis includes: a diaphragm STO, a first lens E1, a second lens E2, a third lens E3, a fourth lens E4, a fifth lens E5, a sixth lens E6, a seventh lens E7, an eighth lens E8, a filter E9, and an imaging surface S19.

The first lens E1 has a positive focal power, with an object side surface S1 being a convex surface and an image side surface S2 being a convex surface. The second lens E2 has a negative focal power, with an object side surface S3 being a convex surface and an image side surface S4 being a concave surface. The third lens E3 has a negative focal power, with an object side surface S5 being a convex surface and an image side surface S6 being a concave surface. The fourth lens E4 has a positive focal power, with an object side surface S7 being a convex surface and an image side surface S8 being a convex surface. The fifth lens E5 has a negative focal power, with an object side surface S9 being a concave surface and an image side surface S10 being a convex surface. The sixth lens E6 has a negative focal power, with an object side surface S11 being a convex surface and an image side surface S12 being a concave surface. The seventh lens E7 has a positive focal power, with an object side surface S13 being a convex surface and an image side surface S14 being a convex surface. The eighth lens E8 has a negative focal power, with an object side surface S15 being a concave surface and an image side surface S16 being a concave surface. The filter E9 has an object side surface S17 and an image side surface S18. Light from the object passes sequentially through the respective surfaces S1 to S18 and is finally imaged on an imaging surface S19.

In the embodiment) the total effective focal length f of the optical imaging lens is 5.33 mm, and the maximum FOV of the optical imaging lens is 79.0°.

Table 11 shows a basic parameter table of the optical imaging lens of embodiment 6, wherein, the units of curvature radius, thickness/distance, and focal length are millimeters (mm).

TABLE 11

| surface Number | Surface Types | Curvature radius | Thickness/ Distance | Materials Refractive index | Materials Abbe number | Focal Length | Conic coefficient |
|---|---|---|---|---|---|---|---|
| OBJ | Sphere | Infinity | Infinity | | | | |
| STO | Sphere | Infinity | −0.7075 | | | | |
| S1 | Aspheric Surface | 3.1440 | 0.8876 | 1.546 | 56.11 | 5.40 | 0.0000 |
| S2 | Aspheric Surface | −42.7606 | 0.0300 | | | | 0.0000 |
| S3 | Aspheric Surface | 2.2608 | 0.2580 | 1.678 | 19.25 | −9.97 | 0.0583 |
| S4 | Aspheric Surface | 1.6158 | 0.7683 | | | | −0.0693 |
| S5 | Aspheric Surface | 61.8597 | 0.5416 | 1.546 | 56.11 | −127.99 | 0.0000 |
| S6 | Aspheric Surface | 32.7094 | 0.1011 | | | | 0.0000 |
| S7 | Aspheric Surface | 7.0470 | 0.5963 | 1.546 | 56.11 | 8.94 | 3.6351 |
| S8 | Aspheric Surface | −15.3811 | 0.4364 | | | | 0.0000 |
| S9 | Aspheric Surface | −1.1153 | 0.2400 | 1.678 | 19.25 | −14.09 | −0.9959 |
| S10 | Aspheric Surface | −1.3726 | 0.0300 | | | | −1.0292 |
| S11 | Aspheric Surface | 6.5915 | 0.5635 | 1.559 | 44.69 | −8.63 | −3.6539 |
| S12 | Aspheric Surface | 2.7061 | 0.0300 | | | | −0.1176 |
| S13 | Aspheric Surface | 1.6450 | 0.5014 | 1.546 | 56.11 | 3.01 | −0.9900 |
| S14 | Aspheric Surface | −885.8726 | 0.6788 | | | | 5.0000 |
| S15 | Aspheric Surface | −6.4940 | 0.4500 | 1.546 | 56.11 | −4.50 | 1.5447 |
| S16 | Aspheric Surface | 4.0537 | 0.1410 | | | | 0.0000 |

TABLE 11-continued

| surface Number | Surface Types | Curvature radius | Thickness/ Distance | Materials | | Focal Length | Conic coefficient |
| --- | --- | --- | --- | --- | --- | --- | --- |
| | | | | Refractive index | Abbe number | | |
| S17 | Sphere | Infinity | 0.2100 | 1.517 | 64.17 | | |
| S18 | Sphere | Infinity | 0.8400 | | | | |
| S19 | Sphere | Infinity | | | | | |

In embodiment, both the object side surface and the image side surface of any one of the first lens E1 to the eighth lens E8 are aspheric surfaces. The higher order term coefficients $A_4, A_6, A_8, A_{10}, A_{12}, A_{14}, A_{16}, A_{18}$ and $A_{20}$ that can be used for each of aspherical mirror surfaces S1-S16 in embodiment 65 are given in Table 12 below.

TABLE 12

| Surface Number | A4 | A6 | A8 | A10 | A12 | A14 | A16 | A18 | A20 |
| --- | --- | --- | --- | --- | --- | --- | --- | --- | --- |
| S1 | 4.6578E−03 | 1.8577E−04 | −1.3298E−03 | 1.3463E−03 | −5.8185E−04 | 1.3191E−04 | −1.5878E−05 | 1.5294E−06 | −1.7363E−07 |
| S2 | 2.8802E−02 | −1.8963E−02 | 1.1675E−02 | −5.2098E−03 | 1.4959E−03 | −2.4364E−04 | 1.6427E−05 | 0.0000E+00 | 0.0000E+00 |
| S3 | −6.5660E−02 | 3.2759E−02 | −3.5601E−02 | 3.0733E−02 | −1.8313E−02 | 6.7579E−03 | −1.3884E−03 | 1.2145E−04 | 0.0000E+00 |
| S4 | −1.0901E−01 | 5.7811E−02 | −5.8732E−02 | 4.4648E−02 | −2.4785E−02 | 8.6897E−03 | −1.8128E−03 | 2.0945E−04 | −1.5557E−05 |
| S5 | −1.7584E−02 | 1.0971E−02 | −3.3281E−02 | 5.2362E−02 | −5.4936E−02 | 3.6309E−02 | −1.4654E−02 | 3.2953E−03 | −3.1661E−04 |
| S6 | −7.8055E−02 | 2.3119E−02 | −5.1378E−02 | 8.0154E−02 | −7.2305E−02 | 3.9657E−02 | −1.3070E−02 | 2.3741E−03 | −1.8214E−04 |
| S7 | −7.7149E−02 | 2.6830E−02 | −9.0401E−02 | 1.3680E−01 | −1.1746E−01 | 6.2138E−02 | −1.9878E−02 | 3.4947E−03 | −2.5683E−04 |
| S8 | −1.0840E−02 | −6.6365E−03 | −3.0636E−02 | 3.9580E−02 | −2.3164E−02 | 7.2702E−03 | −1.1800E−03 | 7.5296E−05 | 6.4218E−07 |
| S9 | 2.5560E−01 | −2.4926E−01 | 1.6906E−01 | −6.3499E−02 | 8.1345E−03 | 2.8388E−03 | −1.3275E−03 | 2.0679E−04 | −1.1813E−05 |
| S10 | 2.0530E−01 | −2.0253E−01 | 1.4284E−01 | −6.6188E−02 | 2.0002E−02 | −3.7834E−03 | 4.1031E−04 | −2.0038E−05 | 8.5086E−08 |
| S11 | −4.3110E−02 | 4.7947E−02 | −3.9897E−02 | 1.9911E−02 | −6.8324E−03 | 1.5940E−03 | −2.3869E−04 | 2.0570E−05 | −7.6956E−07 |
| S12 | −3.1949E−01 | 2.6210E−01 | −1.5740E−01 | 6.3215E−02 | −1.7016E−02 | 3.0157E−03 | −3.3446E−04 | 2.0899E−05 | −5.5978E−07 |
| S13 | −1.4147E−01 | 1.0968E−01 | −8.2549E−02 | 3.3244E−02 | −7.8003E−03 | 1.1204E−03 | −9.7298E−05 | 4.6941E−06 | −9.6625E−08 |
| S14 | 1.7795E−01 | −1.2372E−01 | 3.4203E−02 | −4.4872E−03 | 2.3789E−04 | −7.2862E−07 | 4.4279E−07 | −1.0871E−07 | 4.5691E−09 |
| S15 | −1.4613E−02 | −4.0791E−02 | 2.6169E−02 | −6.7793E−03 | 9.7613E−04 | −8.5154E−05 | 4.5132E−06 | −1.3454E−07 | 1.7338E−09 |
| S16 | −4.8157E−02 | −9.9788E−03 | 1.0362E−02 | −3.1064E−03 | 5.0181E−04 | −4.8261E−05 | 2.7613E−06 | −8.6827E−08 | 1.1554E−09 |

Figure 12A:
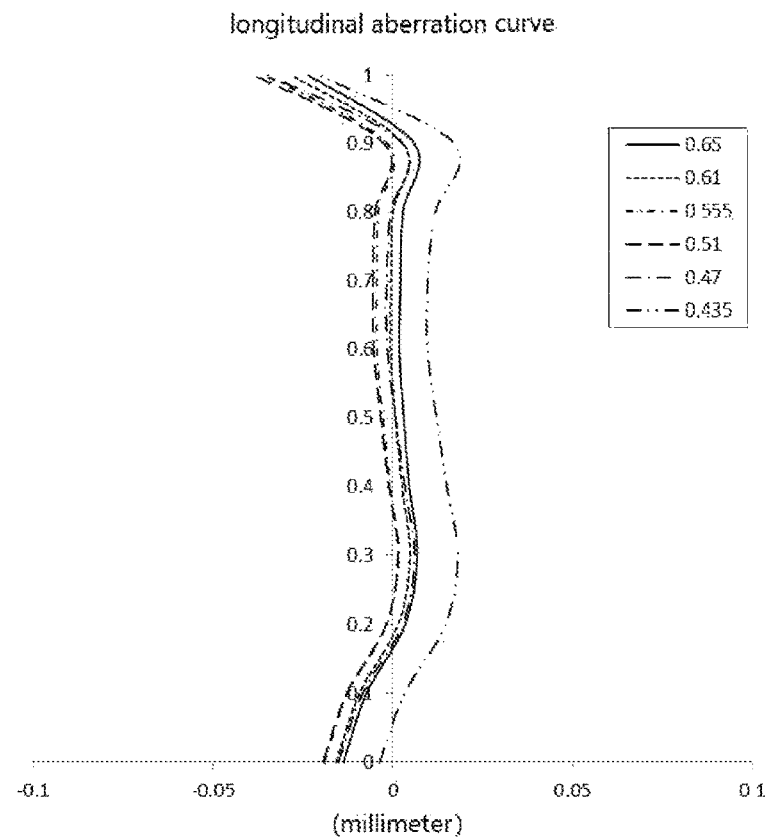
FIGS. 12A to 12D show an longitudinal aberration curve, an astigmatism curve, a distortion curve and a lateral color curve of the optical imaging lens of embodiment 6, respectively.
Figure 12B:
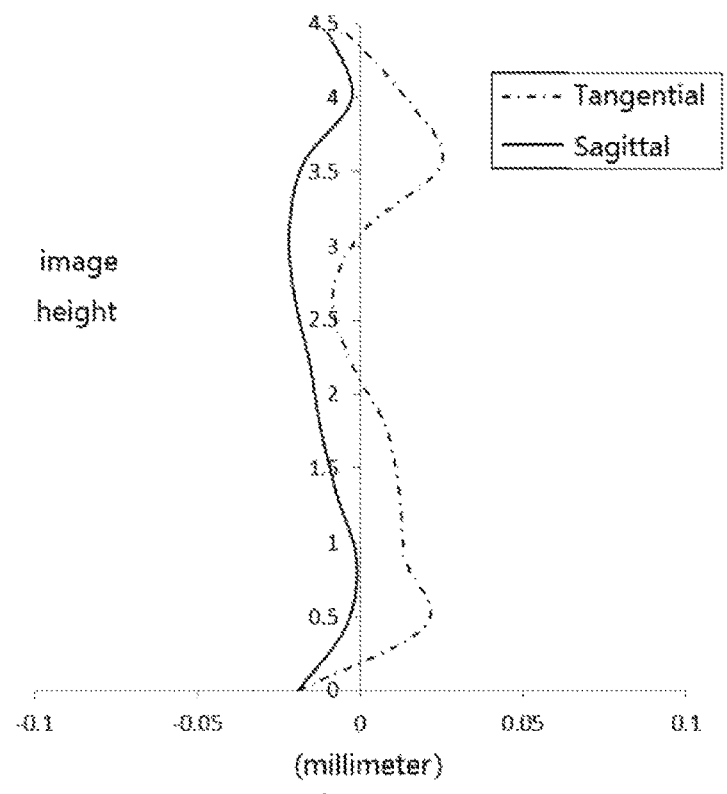
Figure 12C:
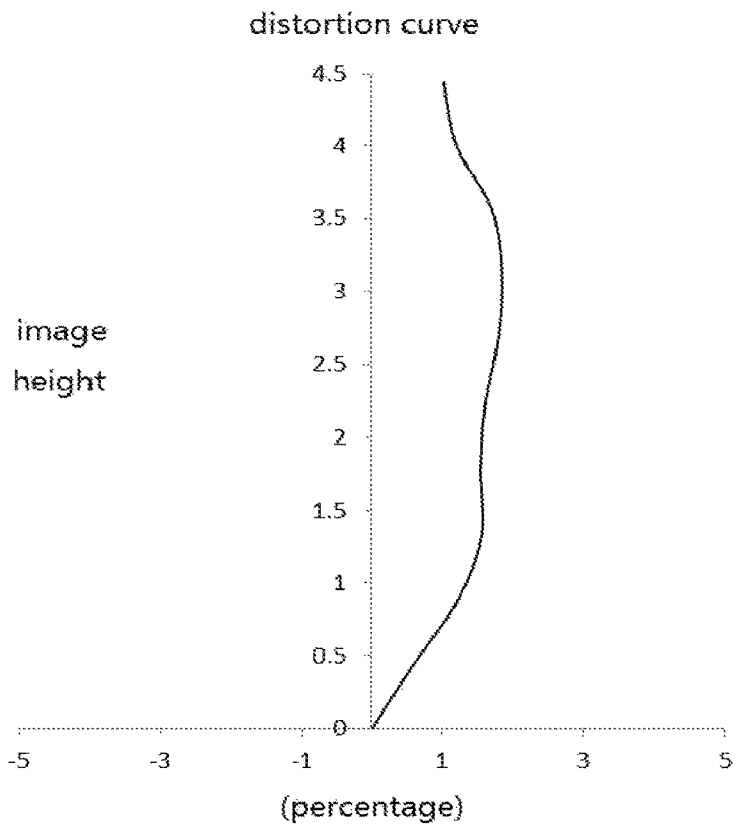
Figure 12D:
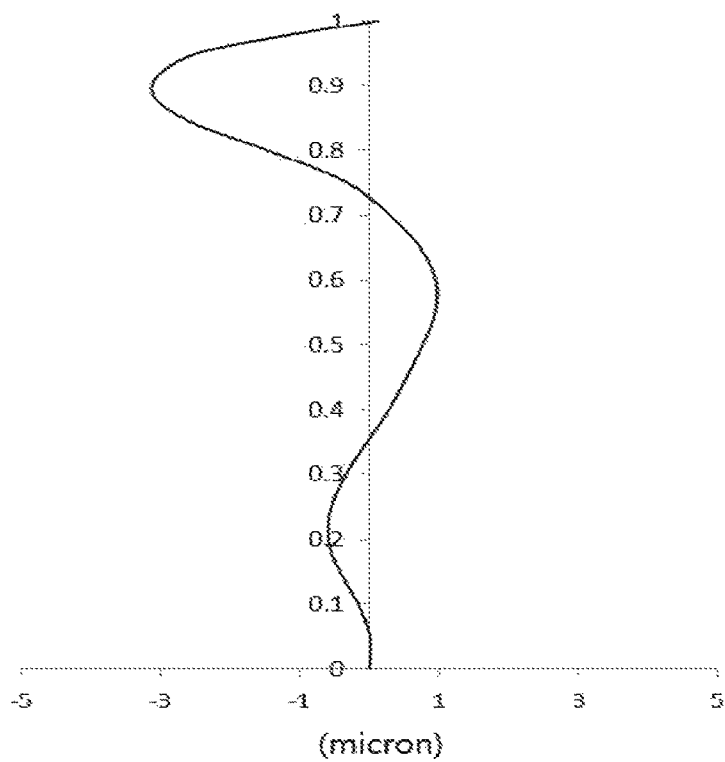

FIG. 12A shows an longitudinal aberration curve of the optical imaging lens of embodiment 6, which indicates the deviations of light of different wavelengths from a convergent focus point after passing through the lens. FIG. 12B shows anastigmatic curve of the optical imaging lens of embodiment 6, which indicates meridian image plane curvature and a sagittal image plane curvature. FIG. 12O shows a distortion curve of the optical imaging lens of embodiment 6, which indicates distortion magnitude values corresponding to different image heights. FIG. 12D shows the lateral color curve of the optical imaging lens of embodiment 6, which indicates the deviation of different image heights on the imaging surface of light passing through the lens. It can be seen from FIGS. 2A to 12D that, the optical imaging lens provided in embodiment 6 can achieve good imaging quality.

In summary, Embodiments 1 to 6 satisfy the relationships shown in Table 13, respectively.

TABLE 13

| Conditions/ Embodiments | 1 | 2 | 3 | 4 | 5 | 6 |
| --- | --- | --- | --- | --- | --- | --- |
| f/R13 | 2.90 | 2.97 | 3.30 | 3.24 | 3.29 | 3.24 |
| T23/CT2 | 3.19 | 3.11 | 2.78 | 2.96 | 3.08 | 2.98 |
| T45/CT5 | 2.12 | 2.18 | 1.93 | 1.74 | 1.87 | 1.82 |
| f/f7 | 1.88 | 1.89 | 1.74 | 1.77 | 1.82 | 1.77 |
| f5/f6 | 0.86 | 1.01 | 1.83 | 1.73 | 1.32 | 1.63 |
| f/R3 + f/R4 | 5.72 | 5.61 | 5.68 | 5.68 | 5.63 | 5.65 |
| f/R9 + f/R10 | −8.86 | −8.87 | −8.69 | −8.59 | −8.75 | −8.66 |
| f/f1 | 0.93 | 1.02 | 0.97 | 0.99 | 0.98 | 0.99 |
| f/f34 | 0.48 | 0.48 | 0.55 | 0.56 | 0.52 | 0.55 |
| f/f67 | 1.41 | 1.40 | 1.06 | 1.09 | 1.24 | 1.11 |
| f2/f8 | 2.84 | 2.48 | 2.17 | 2.25 | 2.37 | 2.21 |
| R1/R2 | −0.02 | −0.11 | −0.04 | −0.06 | −0.08 | −0.07 |
| (CT3 + CT4)/ (CT6 + CT7) | 1.04 | 1.07 | 1.01 | 1.05 | 1.14 | 1.07 |
| T78/CT8 | 1.62 | 1.36 | 1.62 | 1.55 | 1.47 | 1.51 |
| TTL/EPD | 1.95 | 1.94 | 1.89 | 1.91 | 1.95 | 1.92 |
| fxTAN (FOV/2) (mm) | 4.39 | 4.40 | 4.39 | 4.39 | 4.39 | 4.39 |
| f/EPD | 1.40 | 1.40 | 1.40 | 1.40 | 1.40 | 1.40 |
| V7−V6 | 10.33 | 12.83 | 0.00 | 11.94 | 11.00 | 11.42 |

The above description is only an explanation of preferred Embodiments of the disclosure and the applied technical principles. Those skilled in the art should understand that the scope of the disclosure involved in this application is not limited to the technical solution formed by the specific combination of the above technical features, and should also cover other technical solutions formed by any combination of the above technical features or equivalent features thereof without departing from the inventive concept. For example, the above-mentioned features and the technical features disclosed in this application (but not limited to) with similar functions are mutually replaced to form a technical solution.

What is claimed is:

1. An optical imaging lens with eight lenses, sequentially comprising from an object side to an image side along an optical axis:
   a first lens having a positive focal power;
   a second lens having a negative focal power, with an object side surface being a convex surface, and an image side surface being a concave surface;
   a third lens having a negative focal power;
   a fourth lens having a positive focal power;
   a fifth lens having a negative focal power, with an object side surface being a concave surface and an image side surface being a convex surface;
   a sixth lens having a negative focal power;
   a seventh lens having a positive focal power; and
   an eighth lens having a negative focal power;
   wherein, a total effective focal length f of the optical imaging lens and a combined focal length f34 of the third lens and the fourth lens satisfy:

$0<f/f34\leq0.6$;

a center thickness CT3 of the third lens on the optical axis, a center thickness CT4 of the fourth lens on the optical axis, a center thickness CT6 of the sixth lens on the optical axis, and a center thickness CT7 of the seventh lens on the optical axis satisfy:

$1\leq(CT3+CT4)/(CT6+CT7)<1.2$.

2. The optical imaging lens according to claim 1, wherein the total effective focal length f of the optical imaging lens and a curvature radius R13 of an object side surface of the seventh lens satisfy:

$f/R13>2.5$.

3. The optical imaging lens according to claim 1, wherein a spacing distance T23 of the second lens and the third lens on the optical axis and a center thickness CT2 of the second lens on the optical axis satisfy:

$2.0<T23/CT2<3.5$.

4. The optical imaging lens according to claim 1, wherein a spacing distance T45 of the fourth lens and the fifth lens on the optical axis and a center thickness CT5 of the fifth lens on the optical axis satisfy:

$1.5<T45/CT5<2.5$.

5. The optical imaging lens according to claim 2, wherein the total effective focal length f of the optical imaging lens and an effective focal length f7 of the seventh lens satisfy:

$1.5<f/f7<2.0$.

6. The optical imaging lens according to claim 4, wherein an effective focal length f5 of the fifth lens and an effective focal length f6 of the sixth lens satisfy:

$0.8\leq f5/f6<2.0$.

7. The optical imaging lens according to claim 3, wherein the total effective focal length f of the optical imaging lens, a curvature radius R3 of an object side surface of the second lens, and a curvature radius R4 of an image side surface of the second lens satisfy:

$f/R3+f/R4>4.5$.

8. The optical imaging lens of claim 6, wherein the total effective focal length f of the optical imaging lens, a curvature radius R9 of an object side surface of the fifth lens, and a curvature radius R10 of an image side surface of the fifth lens satisfy:

$f/R9+f/R10<-7.0$.

9. The optical imaging lens according to claim 1, wherein the total effective focal length f of the optical imaging lens and an effective focal length f1 of the first lens satisfy:

$0.9\leq f/f1\leq1.1$.

10. The optical imaging lens according to claim 5, wherein the total effective focal length f of the optical imaging lens and a combined focal length f67 of the sixth lens and the seventh lens satisfy:

$1.0\leq f/f67<1.5$.

11. The optical imaging lens according to claim 1, wherein the total effective focal length f of the optical imaging lens and an Entrance Pupil Diameter (EPD) of the optical imaging lens satisfy:

$f/EPD<1.45$.

12. The optical imaging lens according to claim 3, wherein an effective focal length f2 of the second lens and an effective focal length f8 of the eighth lens satisfy:

$2<f2/f8<3$.

13. The optical imaging lens according to claim 9, wherein a curvature radius R1 of an object side surface of the first lens and a curvature radius R2 of an image side surface of the first lens satisfy:

$0.5<R1/R2<0$.

14. The optical imaging lens according to claim 12, wherein a spacing distance T78 of the seventh lens and the eighth lens on the optical axis and a center thickness CT8 of the eighth lens on the optical axis satisfy:

$1.2<T78/CT8<1.8$.

15. The optical imaging lens according to claim 11, wherein a distance TTL from an object side surface of the first lens to an imaging surface of the optical imaging lens on the optical axis and EPD of the optical imaging lens satisfy:

$TTL/EPD\leq2.0$.

16. The optical imaging lens according to claim 11, wherein the total effective focal length f of the optical imaging lens and a maximum Field of View (FOV) of the optical imaging lens satisfy:

$f\times TAN(FOV/2)>4.0mm$.

17. The optical imaging lens according to claim 10, wherein Abbe number V7 of the seventh lens and Abbe number V6 of the sixth lens satisfy:

$0\leq V7-V6<15$.

* * * * *